United States Patent
Kim

(10) Patent No.: US 11,623,688 B2
(45) Date of Patent: Apr. 11, 2023

(54) STEERING CONTROL DEVICE AND STEERING CONTROL METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 775 days.

(21) Appl. No.: 16/653,930

(22) Filed: Oct. 15, 2019

(65) Prior Publication Data

US 2020/0114964 A1 Apr. 16, 2020

(30) Foreign Application Priority Data

Oct. 16, 2018 (KR) .......................... 10-2018-0122902

(51) Int. Cl.
  *B62D 6/10* (2006.01)
  *G01L 5/22* (2006.01)
  *B60W 10/20* (2006.01)

(52) U.S. Cl.
  CPC .............. *B62D 6/10* (2013.01); *B60W 10/20* (2013.01); *G01L 5/221* (2013.01)

(58) Field of Classification Search
  CPC ...... B62D 6/10; B62D 5/0403; B62D 5/0484; B62D 5/0487; B62D 5/046; B60W 10/20; G01L 5/221
  See application file for complete search history.

(56) References Cited

U.S. PATENT DOCUMENTS

| 11,173,952 | B2 * | 11/2021 | Asao | ................. | H02P 25/16 |
| 11,390,318 | B2 * | 7/2022 | Nakamura | ........... | B62D 5/0487 |
| 2017/0349207 | A1 * | 12/2017 | Maeshima | ............ | B60L 3/0092 |
| 2018/0127023 | A1 * | 5/2018 | Füzes | ................. | B62D 5/0484 |
| 2020/0023887 | A1 * | 1/2020 | Sasaki | ................. | B62D 5/0493 |
| 2020/0083826 | A1 * | 3/2020 | Woo | ................. | B62D 5/046 |
| 2021/0276613 | A1 * | 9/2021 | Beres | ................. | B62D 5/0493 |

* cited by examiner

*Primary Examiner* — Thomas Ingram
(74) *Attorney, Agent, or Firm* — Ladas & Parry, LLP

(57) ABSTRACT

A steering control device, a steering motor, a steering apparatus, and a steering control method are provided. The steering control device includes a first steering controller connected to a first winding of a steering motor, a second steering controller connected to a second winding of the steering motor, and a third steering controller connected to a third winding of the steering motor. The first to third steering controllers may monitor corresponding states and control the steering motor in accordance with a result of the monitoring.

16 Claims, 17 Drawing Sheets

STEERING CONTROL DEVICE AND STEERING CONTROL METHOD

CROSS REFERENCE TO RELATED APPLICATION

This application claims priority from Korean Patent Application No. 10-2018-0122902, filed on Oct. 16, 2018, which is hereby incorporated by reference for all purposes as if fully set forth herein.

BACKGROUND

Field

Embodiments relate to a steering system and, more particularly, to a steering control device and a steering control method.

Description of Related Art

In general, a steering system is a system able to change steering angles of vehicle wheels in accordance with steering power (or torque) that a driver of a vehicle has applied to the steering wheel. Recently, an electric power steering system (EPS) is provided in a vehicle to obtain a stable steering state by reducing the amount of steering power that a driver needs to apply to a steering wheel.

Such an electric power steering system can drive a motor depending on the speed and torque of the vehicle in order to provide optimal steering states to a driver. For example, a driver may be provided with light and comfortable feeling of steering during low speed driving, heavy and safe feeling of steering during high speed driving, and rapid and responsive steering in an emergency.

In particular, recently, demand for redundancy and reliability in steering systems of vehicles is further increasing.

BRIEF SUMMARY

Various aspects provide a steering control device, a steering motor, a steering apparatus, and a steering control method able to improve redundancy and reliability.

According to an aspect, a steering control device may include: a first steering controller connected to a first winding of a steering motor; a second steering controller connected to a second winding of the steering motor; and a third steering controller connected to a third winding of the steering motor. The first to third steering controllers may monitor corresponding states and control the steering motor in accordance with a result of the monitoring.

According to another aspect, a steering control method may include: controlling an output of a first winding of a steering motor by a first steering controller, an output of a second winding of the steering motor by a second steering controller, and an output of a third winding of the steering motor by a third steering controller; and monitoring respective states by the first to third steering controllers and controlling the steering motor in accordance with a result of the monitoring.

In the steering control device, the steering motor, the steering apparatus, and the steering control method according to exemplary embodiments, it is possible to control the output of the steering motor including three windings by three steering controllers, thereby further improving redundancy and reliability in the vehicle.

In the steering control device, the steering motor, the steering apparatus, and the steering control method according to exemplary embodiments, even in the case in which one of three steering controllers moves into an abnormal state, i.e. fails, while the output of the steering motor including three windings is being controlled by the three steering controllers, it is possible to control the output of the steering motor by the remaining two steering controllers, which are in a normal state, thereby improving redundancy and reliability in the vehicle.

In the steering control device, the steering motor, the steering apparatus, and the steering control method according to exemplary embodiments, even in the case in which one of three steering controllers moves into an abnormal state, i.e. fails, while the output of the output of the steering motor including three windings is being controlled by the three steering controllers, it is possible to control the output of the steering motor as in the case in which the three steering controllers are in the normal state by boosting or increasing assistance current by the remaining two steering controllers, which are in the normal state, thereby improving redundancy and reliability in the vehicle and assisting the vehicle without reduction or loss in steering performance.

In the steering control device, the steering motor, the steering apparatus, and the steering control method according to exemplary embodiments, even in the case in which one of three MCUs moves into an abnormal state, i.e. fails, while the output of the output of the steering motor including three windings is being controlled by three steering controllers in each of which an MCU and an inverter are connected to each other, it is possible to control an assistance current of the inverter connected to the failed MCU by the remaining two MCUs, which are in the normal state, as in the case in which the three steering controllers are in the normal state, thereby improving redundancy and reliability in the vehicle and assisting the vehicle without reduction or loss in steering performance.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
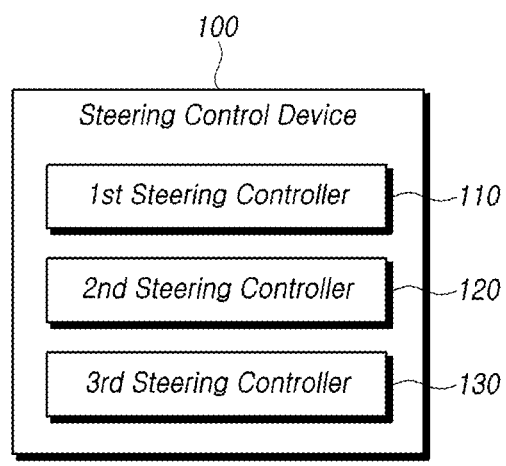
FIG. 1 is a block diagram illustrating an overall configuration of a steering control device according to embodiments.

Hereinafter, the advantages and features and methods of the realization thereof according to the present disclosure will be apparent with reference to the accompanying drawings and detailed descriptions of the embodiments. The present disclosure should not be construed as being limited to the embodiments set forth herein and may be embodied in many different forms. Rather, these embodiments are provided so that the present disclosure will be thorough and complete, and will fully convey the scope of the present disclosure to those skilled in the technical field to which the present disclosure pertains. The scope of embodiments of the present disclosure shall be defined by the appended Claims. Throughout this document, the same reference numerals and symbols will be used to designate the same or like components. The term "and/or" includes any or at least one of mentioned items.

Although terms, such as "first" and "second", may be used to herein to describe elements, components and/or sections, such elements, components and/or sections are not limited by such terms. Each of such terms is used to merely distinguish the corresponding element, component, or section from the other elements, components, or sections. Therefore, the first element, the first component, or the first section mentioned hereinafter may be a second element, a second component, or a second first section within the technical idea of embodiments of the present disclosure.

Terms used herein shall be interpreted as being illustrative, while not being limitative, of embodiments of the present disclosure. As used herein, singular forms are intended to include plural forms unless the context clearly indicates otherwise. It will be understood that the terms "comprise", "include", "have", and any variations thereof used herein are intended to specify the presence of stated components, steps, operations, and/or elements but do not preclude the presence or addition of one or more other components, steps, operations, and/or elements.

Unless otherwise specified, all terms (including technical and scientific terms) used herein have the same meaning as that commonly understood by those skilled in the technical field to which the present disclosure pertains. It will be further understood that terms, such as those defined in commonly used dictionaries, will not be interpreted in an idealized or overly formal sense unless expressly so defined herein.

In addition, in the following description of embodiments of the present disclosure, detailed descriptions of well-known functions and components incorporated herein will be omitted when it is determined that the description may make the subject matter in some embodiments of the present disclosure rather unclear. The terms used hereinafter are defined in consideration of functions thereof in embodiments of the present disclosure, but may vary depending on the intentions of users or operators, as well as practices. Therefore, the terms shall be defined on the basis of the description throughout the specification.

Hereinafter, a steering control device according embodiments of the present disclosure will be described with reference to the accompanying drawings.

FIG. 1 is a block diagram illustrating an overall configuration of a steering control device according to embodiments.

Referring to FIG. 1, the steering control device according to embodiments may include a first steering controller 110, a second steering controller 120, a third steering controller 130, and the like.

For example, the steering control device 100 according to embodiments includes the first steering controller 110 connected to a first winding of a steering motor, the second steering controller 120 connected to a second winding of the steering motor, and the third steering controller 130 connected to a third winding of the steering motor. The first to third steering controllers 110, 120, and 130 may respectively monitor a corresponding state and control the steering motor in accordance with the result of the monitoring.

Here, the corresponding state may include at least one of an internal state, an external state, or a combination thereof. For example, in a case in which the first steering controller 110 performs the monitoring, the internal state may be a state related to the first steering controller 110, while the external state may be a state related to the second and third steering controllers 120 and 130.

That is, the first to third steering controllers 110, 120, and 130 may respectively monitor the internal state thereof. The first to third steering controllers 110, 120, and 130 may be connected to each other via a communications network (hereinafter, simply referred to as a "network") to respectively monitor the external states of the remaining steering controllers. The first to third steering controllers 110, 120, and 130 may monitor at least one of the internal state, the external state, or a combination thereof and control the steering motor in accordance with the result of the monitoring.

Here, the network may include at least one of a wired network, a wireless network, or a combination thereof. In particular, the network may include a control area network (CAN) but is not limited thereto. The network may include any network by which the steering controllers, sensors, and the vehicle can be connected to each other.

Continuing to refer to FIG. 1, if all of the first to third steering controllers 110, 120, and 130 are in a normal state, the steering control device 100 according to embodiments may control the entire output of the steering motor by at least one of the first to third steering controllers 110, 120, and 130.

For example, if all of the first to third steering controllers 110, 120, and 130 are in the normal state, the first steering controller 110 may generate a first assistance current corresponding to a first target assistance current value and provide the first assistance current to the first winding of the steering motor, the second steering controller 120 may generate a second assistance current corresponding to a second target assistance current value and provide the second assistance current to the second winding of the steering motor, and the third steering controller 130 may generate a third assistance current corresponding to a third target assistance current value and provide the third assistance current to the third winding of the steering motor. The first to third steering controllers 110, 120, and 130 may control the entire output of the steering motor by controlling the outputs of the first to third windings of the steering motor in accordance with the first to third assistance currents.

Specifically, each of the first to third steering controllers 110, 120, and 130 may monitor the state thereof. If all of the first to third steering controllers 110, 120, and 130 are in the normal state in accordance with the result of the monitoring, the first to third steering controllers 110, 120, and 130 may control the entire output of the steering motor by controlling the outputs of the first to third windings of the steering motor in accordance with the first to third assistance currents.

That is, if all of the first to third steering controllers 110, 120, and 130 are in the normal state, the first steering controller 110 may generate the first assistance current corresponding to the first target assistance current value and provide the first assistance current to the first winding of the steering motor.

The second steering controller 120 may generate the second assistance current corresponding to the second target assistance current value and provide the second assistance current to the second winding of the steering motor.

The third steering controller 130 may generate the third assistance current corresponding to the third target assistance current value and provide the third assistance current to the third winding of the steering motor.

The first to third steering controllers 110, 120, and 130 may control the outputs of the first to third windings of the steering motor by providing the first to third assistance currents generated thereby to the first to third windings of the steering motor connected thereto, thereby controlling the entire output of the steering motor.

Here, the entire output of the steering motor may be generated in accordance with the outputs of the magnetically-coupled first to third windings of the steering motor. In particular, the entire output of the steering motor may be torque. In addition, the outputs of the first to third windings of the steering motor may be generated in accordance with the first to third assistance currents provided to the first to third windings. In addition, the first to third assistance currents may be generated in accordance with the first to third target assistance current values.

Here, the first to third target assistance current values may be previously-set values but are not limited thereto. The first to third target assistance current values may be determined in accordance with information regarding steering torque. For example, the first to third target assistance current values may be determined in accordance with the information regarding the steering torque and information regarding a vehicle speed.

Here, the first to third target assistance current values may be determined so as not to exceed maximum currents of the first to third steering controllers 110, 120, and 130, respectively, and so that the entire output of the steering motor does not exceed the maximum output of the steering motor.

That is, the first target assistance current value may be determined to be within a range that does not exceed the maximum current of the first steering controller 110. The second target assistance current value may be determined to be within a range that does not exceed the maximum current of the second steering controller 120. The third target assistance current value may be determined to be within a range that does not exceed the maximum current of the third steering controller 130. In addition, the first to third target assistance current values may be determined to be within a range by which the entire output of the steering motor, generated in accordance with the third target assistance current values, does not exceed the maximum output of the steering motor.

Accordingly, the first to third steering controllers 110, 120, and 130 may determine the first to third target assistance current values so as not to exceed the maximum currents of the first to third steering controllers 110, 120, and 130, respectively, and so that the entire output of the steering motor does not exceed the maximum output of the steering motor.

Here, the first to third target assistance current values may be determined so that distribution ratios thereof are equal. In particular, the equal distribution ratios may allow an error range. That is, if the error range is ±1%, the distribution ratios of the first to third target assistance current values may be understood as being equal when the distribution ratio of the target assistance current value is 33%, the distribution ratio of the second target assistance current value 33%, and the distribution ratio of the third target assistance current value is 34%. The distribution ratios and error range may be predetermined, and may be varied in applications.

For example, the first to third target assistance current values may be determined such that the entire output of the steering motor is equally distributed to the first to third windings of the steering motor within an allowable error range.

Accordingly, the first to third steering controllers 110, 120, and 130 may determine the first to third target assistance current values such that the entire output of the steering motor is equally distributed to the first to third windings of the steering motor within the allowable error range.

Continuing to refer to FIG. 1, if one steering controller among the first to third steering controllers 110, 120, and 130 moves into an abnormal state, the steering control device 100 according to embodiments may control the entire output of the steering motor by at least one of the first to third steering controllers 110, 120, and 130.

Hereinafter, a case in which the first steering controller 110 moves into an abnormal state will be described for the sake of brevity. In addition, descriptions in the case in which the first steering controller 110 moves into an abnormal state may be regarded as descriptions of a case in which the second steering controller 120 or the third steering controller 130 moves into an abnormal state.

For example, if the first steering controller 110 moves into the normal state, the second steering controller 120 may generate the second assistance current corresponding to the second target assistance current value and provide the second assistance current to the second winding, and the third steering controller 130 may generate the third assistance current corresponding to the third target assistance current value and provide the third assistance current to the third winding. The second and third steering controllers 120 and 130 may control the entire output of the steering motor by controlling the outputs of the second and third windings of the steering motor in accordance with the second and third assistance currents.

Specifically, each of the first to third steering controllers 110, 120, and 130 may monitor the state of thereof. If the first steering controller 110 moves into an abnormal state in accordance with the result of the monitoring, the second and third steering controllers 120 and 130 may control the entire output of the steering motor by controlling the outputs of the second and third windings of the steering motor in accordance with the second and third assistance currents.

That is, if the first steering controller 110 moves into an abnormal state, the second steering controller 120 may generate the second assistance current corresponding to the second target assistance current value and provide the second assistance current to the second winding of the steering motor.

The third steering controller 130 may generate the third assistance current corresponding to the third target assistance current value and provide the third assistance current to the third winding of the steering motor.

The second and third steering controllers 120 and 130 control the outputs of the second and third windings of the steering motor by providing the second and third assistance currents generated thereby to the second and third windings of the steering motor, thereby controlling the entire output of the steering motor.

Here, the second and third target assistance current values may be determined so as not to exceed the maximum currents of the second and third steering controllers 120 and 130, respectively, and so that the entire output of the steering motor does not exceed the maximum output of the steering motor.

That is, the second target assistance current value may be determined so as not to exceed the maximum current of the second steering controller 120, while the third target assistance current value may be determined so as not to exceed the maximum current of the third steering controller 130. In addition, the second and third target assistance current values may be determined so that the entire output of the steering motor, generated in accordance with the second and third target assistance current values, does not exceed the maximum output of the steering motor.

Accordingly, the second and third steering controllers 120 and 130 may determine the second and third target assistance current values so as not to exceed the maximum currents thereof, respectively, and so that the entire output of the steering motor does not exceed the maximum output of the steering motor.

Here, the second and third target assistance current values may be determined so that distribution ratios thereof are equal. In particular, the equal distribution ratios may allow an error range. That is, if the error range is ±1%, the distribution ratios of the first to third target assistance current values may be understood as being equal when the distribution ratio of the target assistance current value is 33%, the distribution ratio of the second target assistance current value 33%, and the distribution ratio of the third target assistance current value is 34%. The distribution ratios and error range may be predetermined, and may be varied in applications.

For example, the second and third target assistance current values may be determined such that the entire output of the steering motor is equally distributed to the second and third windings of the steering motor within an allowable error range.

Accordingly, the second and third steering controllers 120 and 130 may determine the second and third target assistance current values such that the entire output of the steering motor is equally distributed to the second and third windings of the steering motor within the allowable error range.

Here, the second and third target assistance current values may be determined to be second and third target assistance current values in the case in which all of the first to third steering controllers 110, 120, and 130 are in the normal state.

Accordingly, the second and third steering controllers 120 and 130 may determine the second and third target assistance current values to be the second and third target assistance current values in the case in which all of the first to third steering controllers 110, 120, and 130 are in the normal state.

Here, the second and third target assistance current values may be determined by increasing the second and third target assistance current values in the case in which all of the first to third steering controllers 110, 120, and 130 are in the normal state.

Accordingly, the second and third steering controllers 120 and 130 may determine the second and third target assistance current values by increasing the second and third target assistance current values in the case in which all of the first to third steering controllers 110, 120, and 130 are in the normal state.

Here, the second and third target assistance current values may be determined by reflecting the first target assistance current value in the case in which all of the first to third steering controllers 110, 120, and 130 are in the normal state to the second and third target assistance current values in the case in which all of the first to third steering controllers 110, 120, and 130 are in the normal state.

Accordingly, the second and third steering controllers 120 and 130 may determine the second and third target assistance current values by reflecting the first target assistance current value in the case in which all of the first to third steering controllers 110, 120, and 130 are in the normal state to the second and third target assistance current values in the case in which all of the first to third steering controllers 110, 120, and 130 are in the normal state.

Here, the second and third target assistance current values may be determined by equally distributing the first target assistance current value in the case in which all of the first to third steering controllers 110, 120, and 130 are in the normal state to the second and third target assistance current values in the case in which all of the first to third steering controllers 110, 120, and 130 are in the normal state, within an allowable error range.

Accordingly, the second and third steering controllers 120 and 130 may determine the second and third target assistance current values by equally distributing the first target assistance current value in the case in which all of the first to third steering controllers 110, 120, and 130 are in the normal state to the second and third target assistance current values in the case in which all of the first to third steering controllers 110, 120, and 130 are in the normal state, within the allowable error range.

In addition, if a first controller controlling a first steering motor power supply of the first steering controller 110 moves into an abnormal state, the second steering controller 120 may determine the second target assistance current value by a second controller, generate the second assistance current corresponding to the second target assistance current value by a second steering motor power supply, and provide the second assistance current to the second winding. The third steering controller 130 may determine the third target assistance current value by a third controller, generate the third assistance current corresponding to the third target assistance current value by a third steering motor power supply, and provide the third assistance current to the third winding. The first steering controller 110 may receive the first target assistance current value determined by the second controller of the second steering controller 120 or the third controller of the third steering controller 130, generate the first assistance current corresponding to the first target assistance current value by the first steering motor power supply, and provide the first assistance current to the first winding. The first to third steering controllers 110, 120, and 130 may control the entire output of the steering motor by controlling the outputs of the first to third windings of the steering motor in accordance with the first to third assistance currents.

That is, each of the steering controllers 110, 120, and 130 may include a steering motor power supply and a controller. Each of the controllers may determine a target assistance current value thereof. Each of the steering motor power supplies may generate an assistance current thereof, corresponding to the target assistance current value thereof, and provide the assistance current to a winding connected thereto.

Accordingly, if the first controller determining the first target assistance current value moves into an abnormal state and the first steering motor power supply providing the first assistance current to the first winding is in a normal state, the first steering controller 110 may receive the first target assistance current value determined by the second steering controller 120 or the third steering controller 130, generate the first assistance current corresponding to the first target assistance current value, and provide the first assistance current to the first winding.

Here, the first to third target assistance current values may be determined so as not to exceed the maximum currents of the first to third steering controllers 110, 120, and 130, respectively, and so that the entire output of the steering motor does not exceed the maximum output of the steering motor.

Accordingly, the second and third steering controllers 120 and 130 may determine the first to third target assistance current values so as not to exceed the maximum currents of the first to third steering controllers 110, 120, and 130, respectively, and so that the entire output of the steering motor does not exceed the maximum output of the steering motor.

Here, the first to third target assistance current values may be determined so that distribution ratios thereof are equal. In particular, the equal distribution ratios may allow an error range. That is, if the error range is ±1%, the distribution ratios of the first to third target assistance current values may be understood as being equal when the distribution ratio of the target assistance current value is 33%, the distribution ratio of the second target assistance current value 33%, and the distribution ratio of the third target assistance current value is 34%. The distribution ratios and error range may be predetermined, and may be varied in applications.

For example, the first to third target assistance current values may be determined such that the entire output of the steering motor is equally distributed to the first to third windings of the steering motor within an allowable error range.

Accordingly, the second and third steering controllers 120 and 130 may determine the first to third target assistance current value such that the entire output of the steering motor is equally distributed to the first to third windings of the steering motor within the allowable error range.

Continuing to refer to FIG. 1, if two steering controllers among the first to third steering controllers 110, 120, and 130 move into an abnormal state, the steering control device 100 according to embodiments may control the entire output of the steering motor by at least steering controller among the first to third steering controllers 110, 120, and 130.

Hereinafter, a case in which the first and second steering controllers 110 and 120 move into an abnormal state will be described for the sake of brevity. Descriptions in the case in which the first and second steering controllers 110 and 120 move into an abnormal state may be applied as descriptions of a case in which the second and third steering controllers 120 and 130 or the first and third steering controllers 110, 120, and 130 move into an abnormal state.

For example, if the first and second steering controllers 110 and 120 move into an abnormal state, the third steering controller 130 may generate the third assistance current corresponding to the third target assistance current value and provide the third assistance current to the third winding. The third steering controller 130 may control the entire output of the steering motor by controlling the output of the third winding of the steering motor in accordance with the third assistance current.

Here, the third target assistance current value may be determined so as not to exceed the maximum current of the third steering controller 130 and so that the entire output of the steering motor does not exceed the maximum output of the steering motor.

Accordingly, the third steering controller 130 may determine the third target assistance current value so as not to exceed the maximum current of the third steering controller 130 and so that the entire output of the steering motor does not exceed the maximum output of the steering motor.

Here, the third target assistance current value may be determined to be the third target assistance current value in the case in which all of the first to third steering controllers 110, 120, and 130 are in the normal state.

Accordingly, the third steering controller 130 may determine the third target assistance current value to be the third target assistance current value in the case in which all of the first to third steering controllers 110, 120, and 130 are in the normal state.

Here, the third target assistance current value may be determined by increasing the third target assistance current value in the case in which all of the first to third steering controllers 110, 120, and 130 are in the normal state.

Accordingly, the third steering controller 130 may determine the third target assistance current value by increasing the third target assistance current value in the case in which all of the first to third steering controllers 110, 120, and 130 are in the normal state.

Here, the third target assistance current value may be determined by reflecting at least one of the first and second target assistance current values in the case in which all of the first to third steering controllers 110, 120, and 130 are in the normal state to the third target assistance current value in the case in which all of the first to third steering controllers 110, 120, and 130 are in the normal state.

Accordingly, the third steering controller 130 may determine the third target assistance current value by reflecting at least one of the first and second target assistance current values in the case in which all of the first to third steering controllers 110, 120, and 130 are in the normal state to the third target assistance current value in the case in which all of the first to third steering controllers 110, 120, and 130 are in the normal state.

If the first controller controlling the first steering motor power supply of the first steering controller 110 and the second controller controlling the second steering motor power supply of the second steering controller 120 move into an abnormal state, the third steering controller 130 may determine the third target assistance current value by the third controller, generate the third assistance current corresponding to the third target assistance current value by the third steering motor power supply, and provide the third assistance current to the third winding. The first steering controller 110 may receive the first target assistance current value determined by the third controller of the third steering controller 130, generate the first assistance current corresponding to the first target assistance current value by the first steering motor power supply, and provide the first assistance current to the first winding. The second steering controller 120 may receive the second target assistance current value determined by the third controller of the third steering controller 130, generate the second assistance current corresponding to the second target assistance current value by the second steering motor power supply, and provide the second assistance current to the second winding. The first to third steering controllers 110, 120, and 130 may control the entire output of the steering motor by controlling the outputs of the first to third windings of the steering motor in accordance with the first to third assistance currents.

Accordingly, if the first controller determining the first target assistance current value moves into an abnormal state and the first steering motor power supply providing the first assistance current to the first winding is in a normal state, the first steering controller 110 may receive the first target assistance current value, determined by the third steering controller 130, via the first steering motor power supply, generate the first assistance current corresponding to the first target assistance current value, and provide the first assistance current to the first winding.

In addition, if the second controller determining the second target assistance current value moves into an abnormal state and the second steering motor power supply providing the second assistance current to the second winding is in a normal state, the second steering controller 120 may receive the second target assistance current value, determined by the third steering controller 130, via the second steering motor power supply, generate the second assistance current corresponding to the second target assistance current value, and provide the second assistance current to the second winding.

Here, the first to third target assistance current values may be determined so as not to exceed the maximum currents of the first to third steering controllers 110, 120, and 130, respectively, and so that the entire output of the steering motor does not exceed the maximum output of the steering motor.

Accordingly, the third steering controller 130 may determine the first to third target assistance current values so as not to exceed the maximum currents of the first to third steering controllers 110, 120, and 130, respectively, and so that the entire output of the steering motor does not exceed the maximum output of the steering motor.

Here, the first to third target assistance current values may be determined so that distribution ratios thereof are equal. In particular, the equal distribution ratios may allow an error range. That is, if the error range is ±1%, the distribution ratios of the first to third target assistance current values may be understood as being equal when the distribution ratio of the target assistance current value is 33%, the distribution ratio of the second target assistance current value 33%, and the distribution ratio of the third target assistance current value is 34%. The distribution ratios and error range may be predetermined, and may be varied in applications.

For example, the first to third target assistance current values may be determined such that the entire output of the steering motor is equally distributed to the first to third windings of the steering motor within an allowable error range.

Accordingly, the third steering controller 130 may determine the first to third target assistance current value such that the entire output of the steering motor is equally distributed to the first to third windings of the steering motor within the allowable error range.

Continuing to refer to FIG. 1, if all of the first to third steering controllers 110, 120, and 130 move into an abnormal state, the steering control device 100 according to embodiments may control the entire output of the steering motor by at least one of the first to third steering controllers 110, 120, and 130.

For example, if all of the first to third steering controllers 110, 120, and 130 move into an abnormal state, the first to third steering controllers 110, 120, and 130 may control the entire output of the steering motor so that the steering of the vehicle is operated in accordance with a manual.

Here, if all of the first to third steering controllers 110, 120, and 130 move into an abnormal state, the first to third steering controllers 110, 120, and 130 may not provide the first to third assistance currents to the first to third windings of the steering motor, so that the steering of the vehicle is operated in accordance with the manual. That is, the first to third steering controllers 110, 120, and 130 may not control the steering motor. In this case, the first to third steering controllers 110, 120, and 130 may determine the first to third target assistance current values to be zero (0).

In addition, the steering control device 100 according to embodiments may include an electronic control unit (ECU) but the present disclosure is not limited thereto. The steering control device 100 may include any control device (or system) that can be electronically or electrically controlled.

Figure 2:
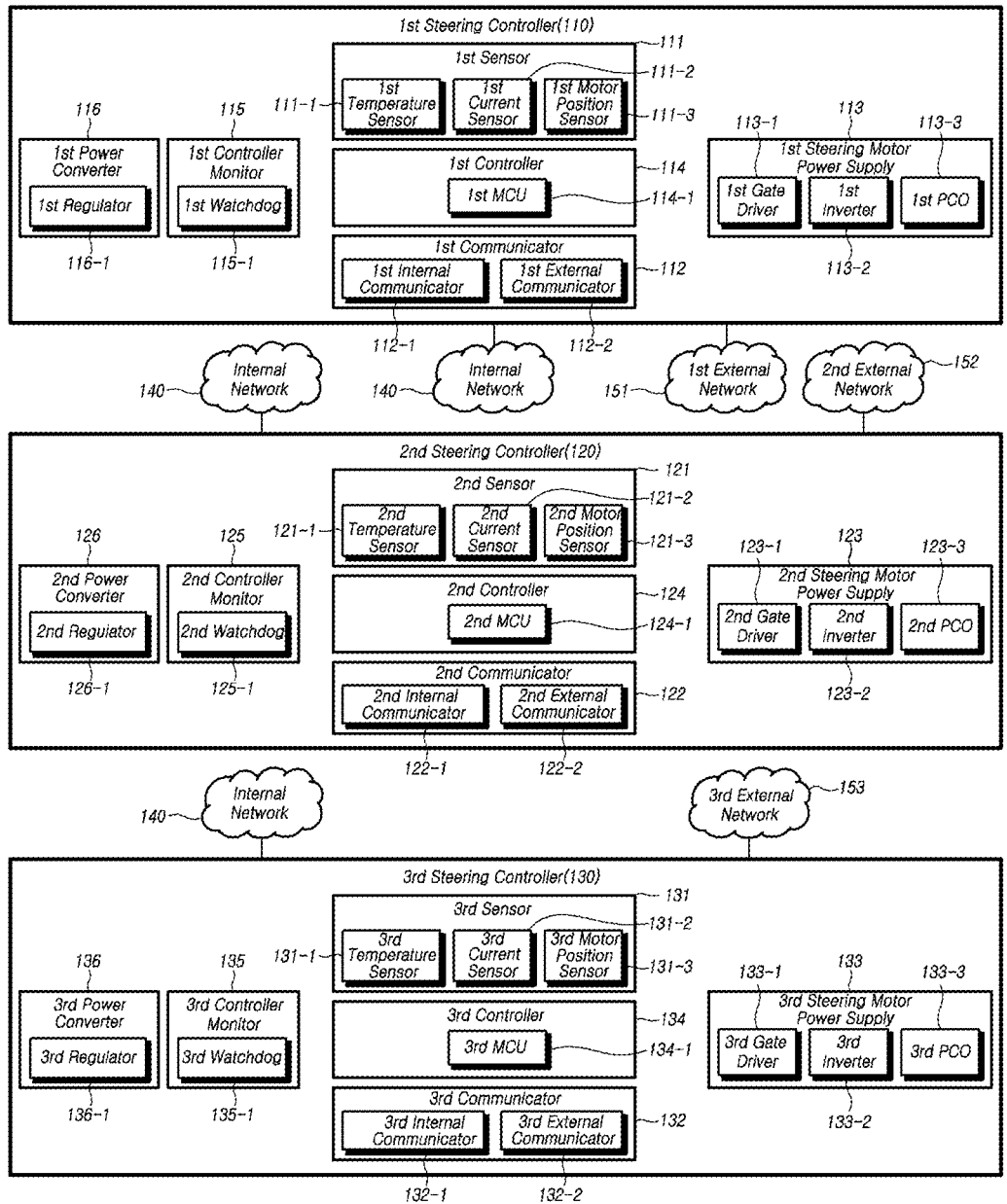
FIG. 2 is a block diagram specifically illustrating the steering controllers according to embodiments.

FIG. 2 is a block diagram specifically illustrating the steering controllers according to embodiments.

Referring to FIG. 2, the steering control device 100 according to embodiments may include the first steering controller 110, the second steering controller 120, and the third steering controller 130. Here, the first steering controller 110 may include a first sensor 111, a first communicator 112, a first steering motor power supply 113, a first controller 114, a first controller monitor 115, a first power converter 116, and the like. The second steering controller 120 may include a second sensor 121, a second communicator 122, a second steering motor power supply 123, a second controller 124, a second controller monitor 125, a second power converter 126, and the like. The third steering controller 130 may include a third sensor 131, a third communicator 132, a third steering motor power supply 133, a third controller 134, a third controller monitor 135, a third power converter 136, and the like.

Since the components of the first steering controller 110 are the same as those of the second steering controller 120 and the third steering controller 130, only the components of the first steering controller 110 will be described hereinafter, for the sake of brevity.

The first sensor 111 may include a first temperature sensor 111-1, a first current sensor 111-2, a first motor position sensor 111-3, and the like, but is not limited thereto. The first sensor 111 may include any sensors able to measure the states of a steering apparatus.

The first temperature sensor 111-1 may measure the temperature of the first steering controller 110. The first temperature sensor 111-1 may obtain first temperature information in accordance with the measured temperature of the first steering controller 110. The first temperature sensor 111-1 may be connected to the first controller 114. The first temperature sensor 111-1 may provide the obtained first temperature information to the first controller 114.

The first current sensor 111-2 may measure a first assistance current between the first steering motor power supply 113 and the steering motor. The first current sensor 111-2 may obtain first assistance current information in accordance with the measured first assistance current. The first current sensor 111-2 may be connected to the first controller 114. The first current sensor 111-2 may provide the obtained first assistance current information to the first controller 114.

The first motor position sensor 111-3 may measure the position of the steering motor. The first motor position sensor 111-3 may obtain first motor position information in accordance with the measured position of the steering motor. The first motor position sensor 111-3 may be connected to the first controller 114. The first motor position sensor 111-3 may provide the obtained first motor position information to the first controller 114.

The first communicator 112 may include a first internal communicator 112-1, a first external communicator 112-2, and the like.

The first internal communicator 112-1 may be connected to a second internal communicator 122-1 of the second steering controller 120 and a third internal communicator 132-1 of the third steering controller 130 via an internal network 140, so that the controllers can transmit to each other and receive information from each other.

In addition, the first internal communicator 112-1 may be connected to the first controller 114. The first internal communicator 112-1 may provide pieces of information (e.g. operating state information of the second steering controller 120 and operating state information of the third steering controller 130), provided from the second steering controller 120 and the third steering controller 130 via the internal network 140, to the first controller 114. In addition, the first internal communicator 112-1 may provide pieces of information (e.g. operating state information of the first steering controller 110), provided from the first controller 114, to the second internal communicator 122-1 and the third internal communicator 132-1 via the internal network 140.

The first external communicator 112-2 may be connected to the vehicle via a first external network 151. That is, the first external communicator 112-2 and the vehicle may be connected to each other via the first external network 151 to transmit information to each other and receive information from each other. For example, the first external communicator 112-2 may provide information (e.g. state information of the vehicle), provided from the vehicle via the first external network 151, to the first controller 114. In addition, the first external communicator 112-2 may provide information (e.g. operating state information of the first steering controller 110), provided from the first controller 114, to the vehicle via the first external network 151.

Here, each of the first internal communicator 112-1 and the second external communicator 112-2 may include at least one of wired and wireless communicators. In particular, each of the first internal communicator 112-1 and the second external communicator 112-2 may include a control area network (CAN) communicator but the present disclosure is not limited thereto. Each of the first internal communicator 112-1 and the second external communicator 112-2 may include any communicator able to connect the corresponding steering controller and the vehicle.

The first steering motor power supply 113 may include a first gate driver 113-1, a first inverter 113-2, a first phase disconnector (PCO) 113-3, and the like.

The first gate driver 113-1 may be connected to the first controller 114. The first gate driver 113-1 may receive a first gate signal from the first controller 114. In addition, the first gate driver 113-1 may be connected to the first inverter 113-2. The first gate driver 113-1 may provide the first gate signal, provided from the first controller 114, to the first inverter 113-2. Here, the first gate driver 113-1 may convert the first gate signal, provided from the first controller 114, into a first gate voltage and provide the first gate voltage to the first inverter 113-2.

The first inverter 113-2 may be connected to a power supply 320. The first inverter 113-2 may receive a first DC voltage from the power supply 320. In addition, the first inverter 113-2 may be connected to the first gate driver 113-1. The first inverter 113-2 may receive the first gate signal from the first gate driver 113-1. Here, the first gate signal may be the first gate voltage.

The first inverter 113-2 may be a DC-AC converter to generate the first assistance current by performing voltage modulation on the first DC voltage, received from the power supply 320, depending on the first gate signal provide from the first gate driver 113-1.

The first inverter 113-2 may be a three-phase inverter but is not limited thereto. The first inverter 113-2 may be varied depending on the steering motor and the power.

The first phase disconnector (PCO) 113-3 may be connected to the first inverter 113-2. The first PCO 113-3 may receive the first assistance current from the first inverter 113-2.

The first PCO 113-3 may supply the first assistance current provided from the first inverter 113-2 or stop the supply of the first assistance current. That is, the first PCO 113-3 may be connected to the steering motor. The first PCO 113-3 may supply the first assistance current, provided from the first inverter 113-2, to the steering motor or stop the supply of the first assistance current.

Here, the phase disconnector is a device or a circuit able to cut off a phase. The phase disconnector may include at least one of a switch, a breaker, a disconnector, or combinations thereof, but is not limited thereto. The phase disconnector may include any device or circuit able to cut off a phase.

As described above, in the steering control device according to embodiments, a single steering motor may be shared via the respective phase disconnectors, and thus the respective inverters may be divided via the respective phase disconnectors, thereby improving the redundancy and reliability in the vehicle.

The first controller 114 may be connected to the first sensor 111, the first communicator 112, the first steering motor power supply 113, the first controller monitor 115, and the first power converter 116 to control the operations of the respective components.

For example, the first controller 114 may generate the first gate signal and control the first assistance current of the first inverter 113-2 by providing the generated first gate signal to the first gate driver 113-1. Here, the first controller 114 may generate the first gate signal in accordance with steering torque information provided from at least one first steering torque sensor, steering angle information provided from at least one first steering angle sensor, first temperature information, first assistance current information, and first motor position information provided from the first sensor 111, and state information of the vehicle (e.g. speed information of the vehicle) provided from the first communicator 112.

Here, the first gate signal may be generated by a predetermined modulation method. In particular, the predetermined modulation method may include at least one voltage modulation method from among a pulse width modulation method, an optimal voltage modulation method, a triangular comparison voltage modulation method, a space vector voltage modulation method, or combinations thereof, but the present disclosure is not limited thereto. The predetermined modulation method may include any method by which the gate signal able to control the operation of the inverter can be generated.

The first controller 114 may include a first microcontroller (MCU) 114-1 but the present disclosure is not limited thereto. The first controller 114 may include any device (or computer) able to process (or execute or compute) a program.

The first controller monitor 115 may be connected to the first controller 114. The first controller monitor 115 may monitor the operating state of the first controller 114. For example, the first controller 114 may provide a watchdog signal to the first controller monitor 115. In addition, the first controller monitor 115 may be cleared or generate a first reset signal in accordance with the first watchdog signal provided from the first controller 114.

In addition, the first controller monitor 115 being cleared may mean that the first controller 114 is operating normally (or ordinarily). In addition, if the first controller monitor 115 generates the first reset signal and provides the first reset signal to the first controller 114, this may mean that the first controller 114 is operating abnormally. The first controller 114 may be reset by the first reset signal.

Here, the first watchdog signal may be a signal instructing the first controller monitor 115 to periodically monitor the operation of the first controller 114 (e.g. a reset prevention signal) That is, the first watchdog signal may be a signal by which the program currently executed by the first controller 114 is confirmed to be alive or operated.

The first controller monitor 115 may include a first watchdog 115-1 but is not limited thereto. The first controller monitor 115 may include any device able to monitor the first controller 114. In particular, the first watchdog 115-1 may include a window watchdog having deadlines, i.e. a start and an end.

The first power converter 116 may be connected to the power supply 320. The first power converter 116 may receive a first DC voltage from the power supply 320. The first power converter 116 may generate at least one first operating voltage by converting the first DC voltage. The first power converter 116 may provide the generated at least one first operating voltage to the first sensor 111, the first communicator 112, the first steering motor power supply 113, the first controller 114, and the first controller monitor 115.

Here, the first operating voltage may be a voltage by which the first sensor 111, the first communicator 112, the first steering motor power supply 113, the first controller 114, and the first controller monitor 115 can be operated. Thus, the first operating voltage may be a plurality of voltages, and may be variously generated depending on the operating voltages of the first sensor 111, the first communicator 112, the first steering motor power supply 113, the first controller 114, and the first controller monitor 115.

In addition, the first power converter 116 may include a DC-DC converter. Although the first power converter 116 includes a DC-DC converter, the first power converter 116 is not limited thereto. The first power converter 116 may include any converter able to receive the first DC voltage and convert the first DC voltage into a first operating voltage lower than the received first DC voltage.

In addition, the first power converter 116 may include a first regulator 116-1. Here, the first regulator 116-1 may receive the first DC voltage and convert the received first DC voltage into a first operating voltage lower than the received first DC voltage.

The first to third steering controllers may perform all of the functions of the first to third steering controllers, as described above with reference to FIG. 1.

Hereinafter, a steering motor according to embodiments will be described with reference to the accompanying drawings. The steering motor may be controlled by the above-described steering control device. Therefore, the descriptions of the above-described steering control device may be equivalently applied to the steering motor without departing from the technical idea of the present disclosure. Hereinafter, repeated descriptions regarding the operation of the steering motor will be omitted, if not required.

The steering motor according to embodiments may include: a first winding connected to a first steering controller; a second winding connected to a second steering controller; and a third winding connected to a third steering controller. The steering motor may be controlled in accordance with the result of the monitoring by the first to third steering controllers.

Figure 3:
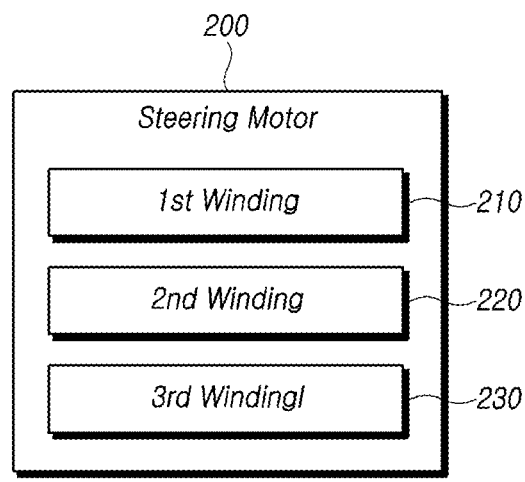
FIG. 3 is a block diagram illustrating an overall configuration of a steering motor according to embodiments.

FIG. 3 is a block diagram illustrating an overall configuration of the steering motor according to embodiments.

Referring to FIG. 3, the steering motor 200 according to embodiments may include a first winding 210, a second winding 220, a third winding 230, and the like.

For example, the steering motor 200 according to embodiments may include the first winding 210 connected to the first steering controller, the second winding 220 connected to the second steering controller, and the third winding 230 connected to the third steering controller. The steering motor 200 may be controlled in accordance with the result of the monitoring by the first to third controllers.

Continuing to refer to FIG. 3, if all of the first to third controllers are in the normal state, the entire output of the steering motor 200 according to embodiments may be controlled by at least one of the first to third controllers.

For example, if all of the first to third controllers are in the normal state, the first winding 210 may receive a first assistance current corresponding to a first target assistance current value from the first steering controller, the second winding 220 may receive a second assistance current corresponding to a second target assistance current value from the second steering controller, and the third winding 230 may receive a third assistance current corresponding to a third target assistance current value from the third steering controller. The outputs of the first to third windings 210, 220, and 230 may be controlled in accordance with the first to third assistance currents, thereby controlling the entire output of the steering motor 200.

Continuing to refer to FIG. 3, if one steering controller of the first to third controllers moves into an abnormal state, the entire output of the steering motor 200 according to embodiments may be controlled by at least one of the first to third steering controllers.

For example, if the first steering controller moves into an abnormal state, the second winding 220 may receive the second assistance current, corresponding to the second target assistance current value, from the second steering controller, and the third winding 230 may receive the third assistance current, corresponding to the third target assistance current value, from the third steering controller. The outputs of the second and third windings 220 and 230 may be controlled in accordance with the second and third assistance currents, thereby controlling the entire output of the steering motor 200.

In addition, if a first controller controlling the first steering motor power supply of the first steering controller moves into an abnormal state, the second winding 220 may receive the second assistance current generated by the second steering motor power supply from the second steering controller. The second assistance current corresponds to the second target assistance current value determined by a second controller. The third winding 230 may receive the third assistance current generated by the third steering motor power supply from the third steering controller. The third assistance current corresponds to the third target assistance current value determined by a third controller. The first winding 210 may receive the first assistance current generated by the first steering motor power supply of the first steering controller from the first steering controller. The first assistance current corresponds to the first target assistance current value determined by the second controller of the second steering controller or the third controller of the third steering controller. The outputs of the first to third windings 210, 220, and 230 may be controlled in accordance with the first to third assistance currents, thereby controlling the entire output of the steering motor 200.

Continuing to refer to FIG. 3, if two steering controllers among the first to third steering controllers move into an abnormal state, the output of the steering motor 200 according to embodiments may be controlled by at least one of the first to third steering controllers.

For example, if the first and second steering controller moves into an abnormal state, the third winding 230 may receive the third assistance current, corresponding to the third target assistance current value, from the third steering controller. The output of the third winding 230 may be controlled in accordance with the third assistance current, thereby controlling the entire output of the steering motor 200.

In addition, if the first controller controlling the first steering motor power supply of the first steering controller and the second controller controlling the second steering motor power supply of the second steering controller move into an abnormal state, the third winding 230 may receive the third assistance current generated by the third steering motor power supply from the third steering controller. The third assistance current corresponds to the third target assistance current value determined by the third controller. The first winding 210 may receive the first assistance current generated by the first steering motor power supply of the first steering controller from the first steering controller. The first assistance current corresponds to the first target assistance current value determined by the third controller of the third steering controller. The second winding 220 may receive the second assistance current generated by the second steering motor power supply of the second steering controller from the second steering controller. The second assistance current corresponds to the second target assistance current value determined by the third controller of the third steering controller. The outputs of the first to third windings 210, 220, and 230 may be controlled in accordance with the first to third assistance currents, thereby controlling the entire output of the steering motor 200.

Continuing to refer to FIG. 3, if all of the first to third steering controllers move into an abnormal state, the entire output of the steering motor 200 according to embodiments may be controlled by at least one of the first to third steering controllers.

For example, if all of the first to third steering controllers move into an abnormal state, the output of the steering motor 200 may be controlled so that the steering of the vehicle is operated in accordance with the manual.

Specifically, if all of the first to third steering controllers move into an abnormal state, the first to third steering controllers may not provide the first to third assistance currents to the first to third windings 210, 220, 230 of the steering motor 200, so that the steering of the vehicle is operated in accordance with the manual. That is, the first to third steering controllers may not control the steering motor. In this case, the first to third steering controllers may determine the first to third target assistance current values to be zero (0).

The steering motor 200 may include a 6 pole 9 slot motor but is not limited thereto. The steering motor 200 may include any motor able to assist in the steering of the vehicle.

Hereinafter, a steering apparatus according to embodiments will be described with reference to the accompanying drawings. The operation of the steering apparatus may be controlled by the above-described steering control device. Therefore, the descriptions of the above-described steering control device may be equivalently applied to the steering apparatus without departing from the technical idea of the present disclosure. Hereinafter, repeated descriptions regarding the operation of the steering apparatus will be omitted, if not required.

The steering apparatus according to embodiments may include a steering controller including first to third steering controllers; and a steering motor including a first winding connected to the first steering controller a second winding connected to the second steering controller, and a third winding connected to the third steering controller. The first to third steering controllers may respectively monitor a corresponding state and control the steering motor in accordance with the result of the monitoring.

Figure 4:
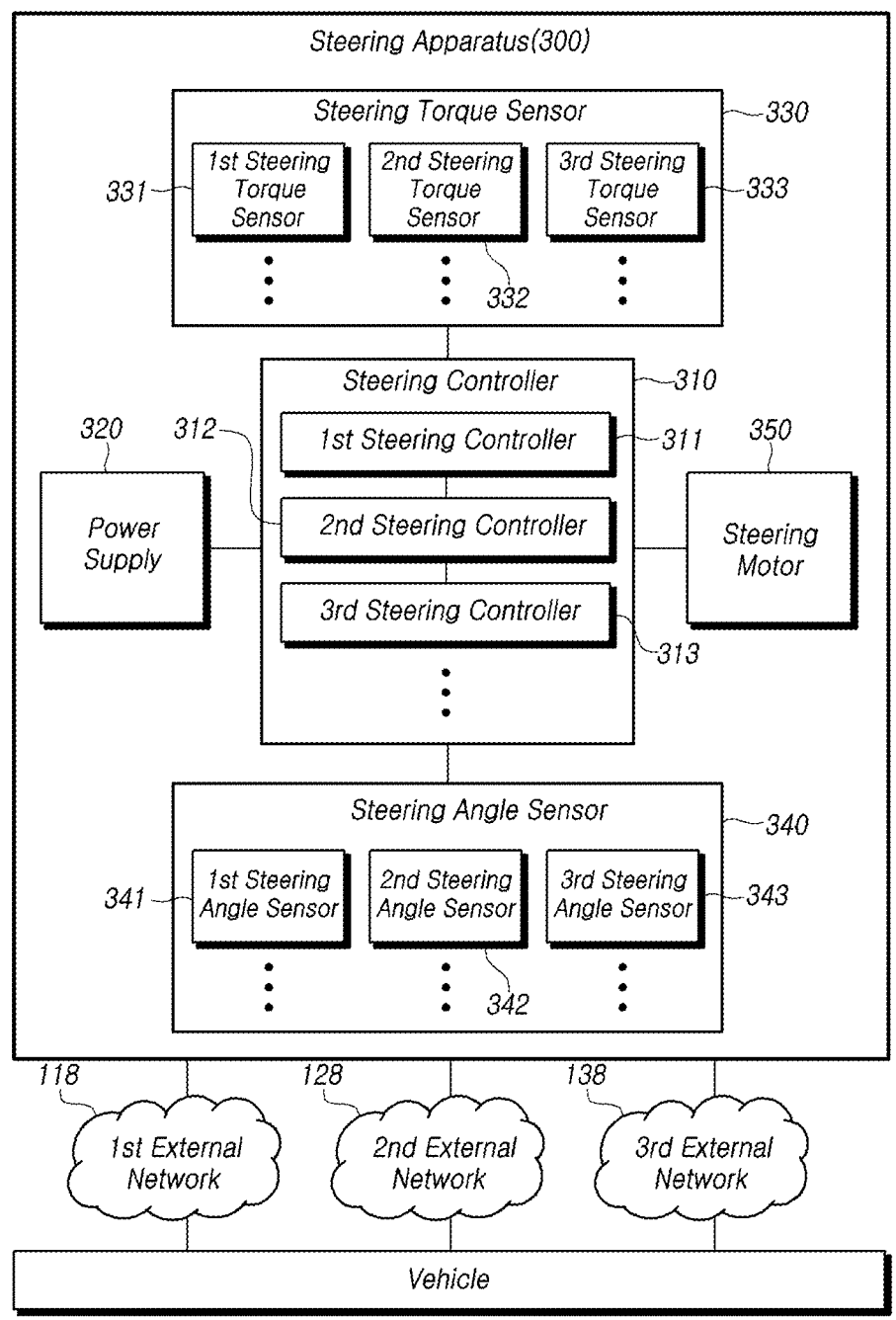
FIG. 4 is a block diagram illustrating an overall configuration of a steering apparatus according to embodiments.

FIG. 4 is a block diagram illustrating an overall configuration of the steering apparatus according to embodiments.

Referring to FIG. 4, the steering apparatus 300 according to embodiments may include a steering controller 310 and a steering motor 350.

Here, the steering controller 310 may be interpreted to be the same component as the steering control device 100, as described above with reference to FIGS. 1 and 2, and the steering motor 350 may be interpreted to be the same component as the steering motor 200, as described above with reference to FIG. 3. Therefore, the steering controller 310 and the steering motor 350, which will be described later, may perform all of the functions of the steering control device 100 and the steering motor 200, as described above with reference to FIGS. 1 to 3.

For example, the steering apparatus 300 according to embodiments may include: the steering controller 310 including first to third steering controllers 311, 312, and 313; and the steering motor 350 including a first winding connected to the first steering controller 311 a second winding connected to the second steering controller 312, and a third winding connected to the third steering controller 313. The first to third steering controllers 311, 312, 313 may respectively monitor a corresponding state and control the steering motor 350 in accordance with the result of the monitoring.

Continuing to refer to FIG. 4, if all of the first to third steering controllers 311, 312, and 313 are in the normal state, the steering apparatus 300 according to embodiments may control the entire output of the steering motor 350 by at least one of the first to third steering controllers 311, 312, and 313.

For example, if all of the first to third steering controllers 311, 312, and 313 are in the normal state, the first steering controller 311 may generate a first assistance current corresponding to a first target assistance current value and provide the first assistance current to the first winding steering motor 350. The second steering controller 312 may generate a second assistance current corresponding to a second target assistance current value and provide the second assistance current to the second winding of the steering motor 350. The third steering controller 313 may generate a third assistance current corresponding to a third target assistance current value and provide the third assistance current to the third winding of the steering motor 350. The first to third steering controllers 311, 312, and 313 may control the entire output of the steering motor 350 by controlling outputs of the first to third windings of the steering motor 350 in accordance with the first to third assistance currents.

Continuing to refer to FIG. 4, if one steering controller of the first to third steering controllers 311, 312, and 313 moves into an abnormal state, the steering apparatus 300 according to embodiments may control the entire output of the steering motor 350 by at least one of the first to third steering controllers 311, 312, and 313.

For example, if the first steering controller 311 moves into an abnormal state, the second steering controller 312 may generate the second assistance current corresponding to the second target assistance current value and provide the second assistance current to the second winding, and the third steering controller 313 may generate the third assistance current corresponding to the third target assistance current value and provide the third assistance current to the third winding. The second and third steering controllers 312 and 313 may control the entire output of the steering motor 350 by controlling the outputs of the second and third windings of the steering motor 350 in accordance with the second and third assistance currents.

In addition, if a first controller controlling a first steering motor power supply of the first steering controller 311 moves into an abnormal state, the second steering controller 312 may determine the second target assistance current value by a second controller, generate the second assistance current corresponding to the second target assistance current value by the second steering motor power supply, and provide the second assistance current to the second winding. The third steering controller 313 may determine the third target assistance current value by a third controller, generate the third assistance current corresponding to the third target assistance current value by the third steering motor power supply, and provide the third assistance current to the third winding. The first steering controller 311 may receive may receive the first target assistance current value determined by the second controller of the second steering controller 312 or the third controller of the third steering controller 313, generate the first assistance current corresponding to the first target assistance current value by the first steering motor power supply, and provide the first assistance current to the first winding. The first to third steering controllers 311, 312, and 313 may control the entire output of the steering motor 350 by controlling the outputs of the first to third windings of the steering motor 350 in accordance with the first to third assistance currents.

Continuing to refer to FIG. 4, if two steering controllers of the first to third steering controllers 311, 312, and 313 move into an abnormal state, the steering apparatus 300 according to embodiments may control the entire output of the steering motor 350 by at least one of the first to third steering controllers 311, 312, and 313.

For example, if the first and second steering controllers 311 and 312 move into an abnormal state, the third steering controller 313 may generate the third assistance current corresponding to the third target assistance current value and provide the third assistance current to the third winding. The third steering controller 313 may control the entire output of the steering motor 350 by controlling the output of the third winding of the steering motor 350 in accordance with the third assistance current.

In addition, if the first controller controlling the first steering motor power supply of the first steering controller 311 and the second controller controlling the second steering motor power supply of the second steering controller 312 move into an abnormal state, the third steering controller 313 may determine the third target assistance current value by the third controller, generate the third assistance current corresponding to the third target assistance current value by the third steering motor power supply, and provide the third assistance current to the third winding. The first steering controller 311 may receive the first target assistance current value determined by the third controller of the third steering controller 313, generate the first assistance current corresponding to the first target assistance current value by the first steering motor power supply, and provide the first assistance current to the first winding. The second steering controller 312 may receive the second target assistance current value determined by the third controller of the third steering controller 130, generate the second assistance current corresponding to the second target assistance current value by the second steering motor power supply, and provide the second assistance current to the second winding. The first to third steering controllers 311, 312, and 313 may control the entire output of the steering motor 350 by controlling the outputs of the first to third windings of the steering motor 350 in accordance with the first to third assistance currents.

Continuing to refer to FIG. 4, if all of the first to third steering controllers 311, 312, and 313 move into an abnormal state, the steering apparatus 300 according to embodiments may control the entire output of the steering motor 350 by at least one of the first to third steering controllers 311, 312, and 313.

For example, if all of the first to third steering controllers 311, 312, and 313 move into an abnormal state, the first to third steering controllers 311, 312, and 313 may control the entire output of the steering motor 350 so that the steering of the vehicle is operated in accordance with the manual.

In addition, the first to third steering controllers 311, 312, and 313 may respectively obtain corresponding state information and control the steering motor 350 in accordance with the obtained state information. For example, the first to third steering controllers 311, 312, and 313 may obtain steering torque information and vehicle speed information by monitoring a steering torque state and a vehicle speed state, generate assistance currents in accordance with the obtained information, and control the steering motor 350 in accordance with the assistance currents.

Here, the state information may include at least one piece of information among pieces of information, including temperature state information, voltage state information, current state information, state information of the steering motor 350 (e.g. motor position state information), power state information, program state information, sensor state information (e.g. steering torque sensor state information, steering angle sensor state information, steering angular velocity sensor state information, steering angular acceleration sensor state information, motor position sensor state information, motor angle sensor state information, encoder state information, yaw rate sensor state information, engine torque sensor state information, accelerator pedal sensor state information, and vehicle speed sensor state information), communications state information, control state information (e.g. steering control state information, assistance control state information, compensation control state information, steering torque state information, steering angle state information, steering angular velocity state information, steering angular acceleration state information, motor position state information, motor angle state information, motor speed state information, yaw rate state information, engine torque state information, accelerator pedal state information, and vehicle speed state information), or combinations thereof. However, the present disclosure is not limited thereto, and the state information may include any information regarding the state of the steering controller.

In addition, each of the first to third steering controllers 311, 312, and 313 may receive a DC voltage, provided to the remaining steering controllers, to control the steering motor 350, if the state information provided thereto is indicative of an abnormal state.

The steering apparatus 300 according to embodiments may include a power supply 320.

The power supply 320 may be connected to the steering controller 310. In addition, the power supply 320 may supply electrical energy to the steering controller 310. In particular, the power supply 320 may provide a DC voltage to the steering controller 310. In particular, the power supply 320 may provide three DC voltages to the steering controller 310.

Here, the three DC voltages may include a first DC voltage, a second DC voltage, and a third DC voltage.

The first DC voltage may be supplied to the first steering controller 311. The first steering controller 311 may receive the first DC voltage to control the steering motor 350.

The second DC voltage may be supplied to the second steering controller 312. The second steering controller 312 may receive the second DC voltage to control the steering motor 350.

The third DC voltage may be supplied to the third steering controller 313. The third steering controller 313 may receive the third DC voltage to control the steering motor 350.

The operation of the power supply 320 may be controlled and monitored by the steering controllers 311 and 312, 313. In addition, the steering controllers 311 and 312, 313 may monitor the operating state of the power supply 320 and the states of the DC voltages supplied to the power supply 320.

Each of the first to third steering controllers 311, 312, and 313 may receive the DC voltage, provided to the remaining steering controllers, to control the steering motor 350, if the DC voltage provided thereto is in an abnormal state.

The steering apparatus 300 according to embodiments may include a steering torque sensor 330.

The steering torque sensor 330 may include three torque sensors. For example, the steering torque sensor 330 may include at least one first steering torque sensor 331, at least one second steering torque sensor 332, and at least one third steering torque sensor 333.

The at least one first steering torque sensor 331, the at least one second steering torque sensor 332, and at least one third steering torque sensor 333 may measure a torque of the steering wheel. In addition, the at least one first steering torque sensor 331, the at least one second steering torque sensor 332, and at least one third steering torque sensor 333 may generate steering torque information in accordance with the measured torque of the steering wheel.

The at least one first steering torque sensor 331 may be connected to the first steering controller 311. In addition, the at least one first steering torque sensor 331 may provide the steering torque information to the first steering controller 311. The first steering controller 311 may control the steering motor 350 in accordance with the steering torque information. For example, the first steering controller 311 may determine the first target assistance current value in accordance with the steering torque information, generate the first assistance current in accordance with the first target assistance current value, and provide the first assistance current to the first winding of the steering motor 350.

The at least one second steering torque sensor 332 may be connected to the second steering controller 312. In addition, the at least one second steering torque sensor 332 may provide the steering torque information to the second steering controller 312. The second steering controller 312 may control the steering motor 350 in accordance with the steering torque information. For example, the second steering controller 312 may determine the second target assistance current value in accordance with the steering torque information, generate the second assistance current in accordance with the second target assistance current value, and provide the second assistance current to the second winding of the steering motor 350.

The at least one third steering torque sensor 333 may be connected to the third steering controller 313. In addition, the at least one third steering torque sensor 333 may provide the steering torque information to the third steering controller 313. The third steering controller 313 may control the steering motor 350 in accordance with the steering torque information. For example, the third steering controller 313 may determine the third target assistance current value in accordance with the steering torque information, generate the third assistance current in accordance with the third target assistance current value, and provide the third assistance current to the third winding of the steering motor 350.

The operation of the steering torque sensor 330 may be controlled and monitored by the steering controllers 311 and 312, 313. In addition, the steering controllers 311 and 312, 313 may monitor the operating state of the steering torque sensor 330 and the steering torque information provided to the steering torque sensor 330.

Each of the first to third steering controllers 311, 312, and 313 may receive the steering torque information, provided to the remaining steering controllers, to control the steering motor 350, if the steering torque information provided thereto is indicative of an abnormal state.

The steering apparatus 300 according to embodiments may include a steering angle sensor 340.

The steering angle sensor 340 may include three steering angle sensors. For example, the steering angle sensor 340 may include at least one first steering angle sensor 341, at least one second steering angle sensor 342, and at least one third steering angle sensor 343.

The at least one first steering angle sensor 341, the at least one second steering angle sensor 342, and the at least one third steering angle sensor 343 may measure the steering angle of the steering wheel. In addition, the at least one first steering angle sensor 341, the at least one second steering angle sensor 342, and the at least one third steering angle sensor 343 may generate steering angle information in accordance with the measured steering angle of the steering wheel.

The at least one first steering angle sensor 341 may be connected to the first steering controller 311. In addition, the at least one first steering angle sensor 341 may provide the steering angle information to the first steering controller 311. The first steering controller 311 may control the steering motor 350 in accordance with the steering angle information. For example, the first steering controller 311 may determine the first target assistance current value in accordance with the steering angle information, generate the first assistance current in accordance with the first target assistance current value, and provide the first assistance current to the first winding of the steering motor 350.

The at least one second steering angle sensor 342 may be connected to the second steering controller 312. In addition, the at least one second steering angle sensor 342 may provide the steering angle information to the second steering controller 312. The at least one second steering angle sensor 342 may control the steering motor 350 in accordance with the steering angle information. For example, the at least one second steering angle sensor 342 may determine the second target assistance current value in accordance with the steering angle information, generate the second assistance current in accordance with the second target assistance current value, and provide the second assistance current to the second winding of the steering motor 350.

The at least one third steering angle sensor 343 may be connected to the third steering controller 313. In addition, the at least one third steering angle sensor 343 may provide the steering angle information to the third steering controller 313. The third steering controller 313 may control the steering motor 350 in accordance with the steering angle information. For example, the third steering controller 313 may determine the third target assistance current value in accordance with the steering angle information, generate the third assistance current in accordance with the third target assistance current value, and provide the third assistance current to the third winding of the steering motor 350.

The operation of the steering angle sensor 340 may be controlled and monitored by the steering controllers 311 and 312, 313. In addition, the steering controllers 311 and 312, 313 may monitor the operating state of the steering angle sensor 340 and the steering angle information of the steering wheel provided to the steering angle sensor 340.

Each of the first to third steering controllers 311, 312, and 313 may receive the steering angle information, provided to the remaining steering controllers, to control the steering motor 350, if the steering angle information provided thereto is indicative of an abnormal state.

FIGS. 5 to 8 are conceptual diagrams illustrating a steering control method according to embodiments.

Referring to FIGS. 5 to 8, the steering apparatus according to embodiments may include first to third MCUs 411, 412, and 413; first to third inverters 421, 422, and 423; and a steering motor 430 including first to third windings 431, 432, and 433.

Figure 5:
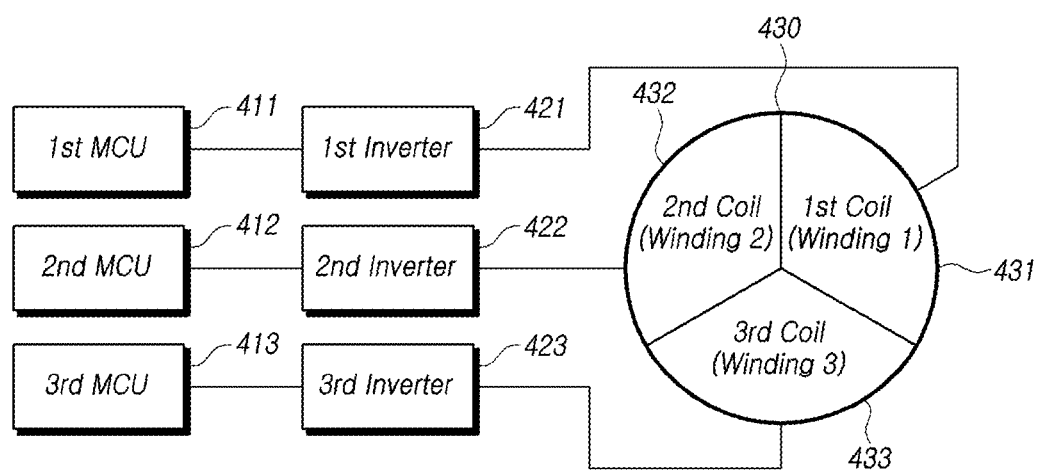
FIGS. 5 to 8 are conceptual diagrams illustrating a steering control method according to embodiments.

Referring to FIG. 5, if the first to third MCUs 411, 412, and 413 and the first to third inverters 421, 422, and 423 are in the normal state, the first MCU 411 may determine a first target assistance current value and generate a first inverter control signal in accordance with the first target assistance current value, and the first inverter 421 may generate a first assistance current corresponding to the first target assistance current value in accordance with the first inverter control signal and provide the first assistance current to the first winding 431 of the steering motor 430 to control the output of the first winding 431 of the steering motor 430.

In the second MCU 412 and the third MCU 413, the second inverter 422 and the second winding 432 of the steering motor 430 and to the third inverter 423 and the third winding 433 of the steering motor 430 may have operations substantially the same as those of the first MCU 411.

The output generated by the steering motor 430 may be 100%, in accordance with the outputs of the first to third windings 431, 432, and 433. Here, first to third target assistance current values may have the same ratios in a predetermined error range.

That is, if a total of the first to third target assistance current values is 100%, if the output of the steering motor 430 is 100%, each of the first to third target assistance current values may be determined to be 33.3% of the total (100%) of the first to third target assistance current values.

Consequently, the first to third inverters 421, 422, and 423 may generate first to third assistance currents, each of which is 33.3%. Each of the first to third windings 431, 432, and 433 of the steering motor 430 may generate an output of 33.3%. Accordingly, the output generated by the steering motor 430 may be 100%.

That is, in the steering control device, the steering motor, the steering apparatus, and the steering control method according to embodiments, it is possible to control the output of the steering motor including the three windings by the three steering controllers, thereby further improving redundancy and reliability in the vehicle.

Figure 6:
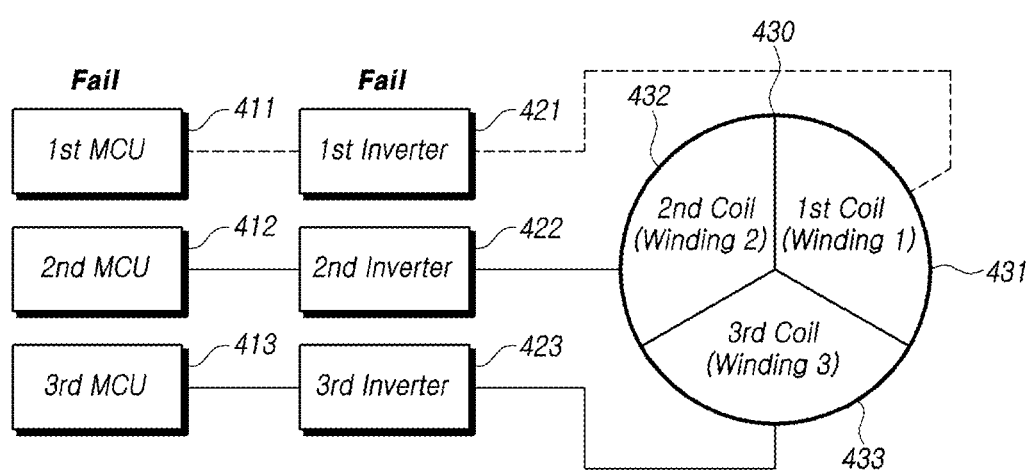

Referring to FIG. 6, if the first MCU 411 and/or the first inverter 421 move to an abnormal state, the first inverter 421 may not provide the first assistance current to the first winding 431 of the steering motor 430.

The second MCU 412 may determine the second target assistance current value and generate a second inverter control signal in accordance with the second target assistance current value, and the second inverter 422 may generate the second assistance current corresponding to the second target assistance current value in accordance with the second inverter control signal and provide the second assistance current to the second winding 432 of the steering motor 430 to control the output of the second winding 432 of the steering motor 430.

The third MCU 413 may determine the third target assistance current value and generate a third inverter control signal in accordance with the third target assistance current value, and the third inverter 423 may generate the third assistance current corresponding to the third target assistance current value in accordance with the third inverter control signal and provide the third assistance current to the third winding 433 of the steering motor 430 to control the output of the third winding 433 of the steering motor 430.

The output generated by the steering motor 430 may be 66.6%, in accordance with the outputs of the second and third windings 432 and 433. Here, the second and third target assistance current values may have the same ratios in the predetermined error range.

That is, each of the second and third target assistance current values may be determined to be about 33.3% of the total of the second and third target assistance current values in the case in which the first to third MCUs 411, 412, and 413 and the first to third inverters 421, 422, and 423 are in the normal state.

Consequently, the second and third inverters 422 and 423 may generate the second and third assistance currents, each of which is 33.3%. Each of the second and third windings 432 and 433 of the steering motor 430 may generate an output of 33.3%. Accordingly, the output generated by the steering motor 430 may be 66.6%.

That is, in the steering control device, the steering motor, the steering apparatus, and the steering control method according to embodiments, even in the case in which one of the three steering controllers moves into an abnormal state, i.e. fails, while the output of the steering motor including the three windings is being controlled by the three steering controllers, it is possible to control the output of the steering motor by the remaining two steering controllers, which are in the normal state, thereby improving redundancy and reliability in the vehicle.

Referring to FIG. 6, if the first MCU 411 and/or the first inverter 421 move to an abnormal state, the first inverter 421 may not provide the first assistance current to the first winding 431 of the steering motor 430.

The second MCU 412 may determine the second target assistance current value and generate the second inverter control signal in accordance with the second target assistance current value, and the second inverter 422 may generate the second assistance current corresponding to the second target assistance current value in accordance with the second inverter control signal and provide the second assistance current to the second winding 432 of the steering motor 430 to control the output of the second winding 432 of the steering motor 430.

The third MCU 413 may determine the third target assistance current value and generate the third inverter control signal in accordance with the third target assistance current value, and the third inverter 423 may generate the third assistance current corresponding to the third target assistance current value in accordance with the third inverter control signal and provide the third assistance current to the third winding 433 of the steering motor 430 to control the output of the third winding 433 of the steering motor 430.

The output generated by the steering motor 430 may be 100%, in accordance with the outputs of the second and third windings 432 and 433. Here, the second and third target assistance current values may have the same ratios in the predetermined error range.

That is, each of the second and third target assistance current values may be determined to about 50% by boosting each of the second and third target assistance current values (33.3%) in the case in which the first to third MCUs 411, 412, and 413 and the first to third inverters 421, 422, and 423 are in the normal state.

Consequently, the second and third inverters 422 and 423 may generate the second and third assistance currents, each of which is 50%. Each of the second and third windings 432 and 433 of the steering motor 430 may generate an output of 50%. Accordingly, the output generated by the steering motor 430 may be 100%.

That is, in the steering control device, the steering motor, the steering apparatus, and the steering control method according to embodiments, even in the case in which one of three steering controllers moves into an abnormal state, i.e. fails, while the output of the output of the steering motor including three windings is being controlled by the three steering controllers, it is possible to control the output of the steering motor as in the case in which the three steering controllers are in the normal state by boosting or increasing the assistance current by the remaining two steering controllers, which are in the normal state, thereby improving redundancy and reliability in the vehicle and assisting the vehicle without reduction or loss in steering performance.

Figure 7:
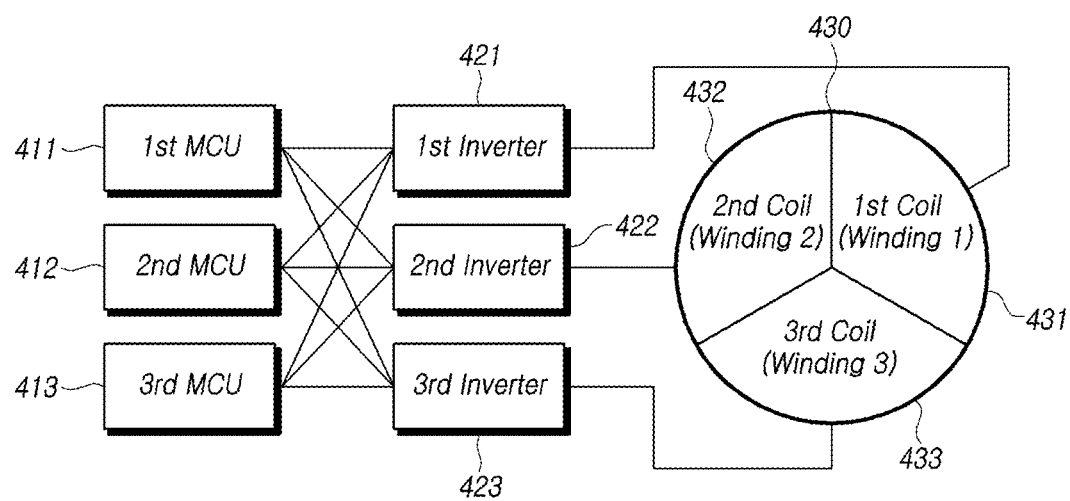

Referring to FIG. 7, the first to third MCUs 411, 412, and 413 may be respectively connected to the first to third inverters 421, 422, and 423.

If the first to third MCUs 411, 412, and 413 and the first to third inverters 421, 422, and 423 are in the normal state, the first MCU 411 may determine the first target assistance current value and generate the first inverter control signal in accordance with the first target assistance current value, and the first MCU 411 may generate the first assistance current corresponding to the first target assistance current value in accordance with the first inverter control signal and provide the first assistance current to the first winding 431 of the steering motor 430 to control the output of the first winding 431 of the steering motor 430.

The second MCU 412 may determine the second target assistance current value and generate the second inverter control signal in accordance with the second target assistance current value, and the second inverter 422 may generate the second assistance current corresponding to the second target assistance current value in accordance with the second inverter control signal and provide the second assistance current to the second winding 432 of the steering motor 430 to control the output of the second winding 432 of the steering motor 430.

The third MCU 413 may determine the third target assistance current value and generate the third inverter control signal in accordance with the third target assistance current value, and the third inverter 423 may generate the third assistance current corresponding to the third target assistance current value in accordance with the third inverter control signal and provide the third assistance current to the third winding 433 of the steering motor 430 to control the output of the third winding 433 of the steering motor 430.

The output generated by the steering motor 430 may be 100%, in accordance with the outputs of the first to third windings 431, 432, and 433. Here, the first to third target assistance current values may have the same ratios in the predetermined error range.

That is, if a total of the first to third target assistance current values is 100%, if the output generated by the steering motor 430 is 100%, each of the first to third target assistance current values may be determined to be 33.3% of the total (100%) of the first to third target assistance current values.

Accordingly, the first to third inverters 421, 422, and 423 may generate the first to third assistance currents, each of which is 33.3%. Each of the first to third windings 431, 432, and 433 of the steering motor 430 may generate an output of 33.3%. Accordingly, the output generated by the steering motor 430 may be 100%.

That is, in the steering control device, the steering motor, the steering apparatus, and the steering control method according to embodiments, it is possible to control the output of the steering motor including the three windings by the three steering controllers, in each of which the MCU and the inverter are connected to each other, thereby further improving redundancy and reliability in the vehicle.

Figure 8:
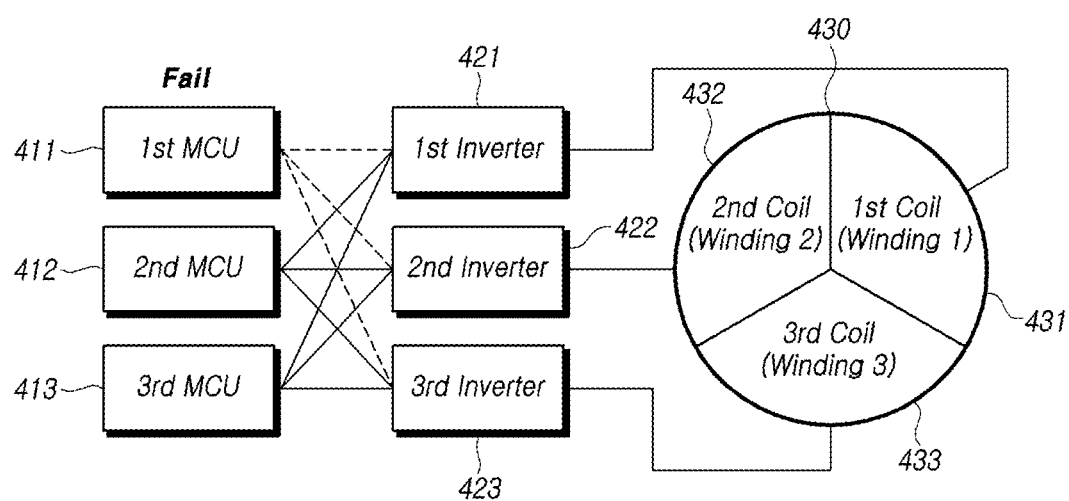

Referring to FIG. 8, the first to third MCUs 411, 412, and 413 may be respectively connected to the first to third inverters 421, 422, and 423.

If the first MCU 411 moves to an abnormal state, the first inverter 421 may receive the first target assistance current value from the second MCU 412 or the third MCU 413, generate the first assistance current corresponding to the first target assistance current value in accordance with the first target assistance current value, and provide the first assistance current to the first winding 431 of the steering motor 430 to control the output of the first winding 431 of the steering motor 430.

The second MCU 412 may determine the second target assistance current value and generate the second inverter control signal in accordance with the second target assistance current value, and the second inverter 422 may generate the second assistance current corresponding to the second target assistance current value in accordance with the second inverter control signal and provide the second assistance current to the second winding 432 of the steering motor 430 to control the output of the second winding 432 of the steering motor 430.

The third MCU 413 may determine the third target assistance current value and generate the third inverter control signal in accordance with the third target assistance current value, and the third inverter 423 may generate the third assistance current corresponding to the third target assistance current value in accordance with the third inverter control signal and provide the third assistance current to the third winding 433 of the steering motor 430 to control the output of the third winding 433 of the steering motor 430.

The output generated by the steering motor 430 may be 100%, in accordance with the outputs of the first to third windings 431, 432, and 433. Here, the first to third target assistance current values may have the same ratios in the predetermined error range.

That is, if a total of the first to third target assistance current values is 100%, if the output of the steering motor 430 is 100%, each of the first to third target assistance current values may be determined to be 33.3% of the total (100%) of the first to third target assistance current values.

Consequently, the first to third inverters 421, 422, and 423 may generate the first to third assistance currents, each of which is 33.3%. Each of the first to third windings 431, 432, and 433 of the steering motor 430 may generate an output of 33.3%. Accordingly, the output generated by the steering motor 430 may be 100%.

That is, in the steering control device, the steering motor, the steering apparatus, and the steering control method according to embodiments, even in the case in which one of the three MCUs moves into an abnormal state, i.e. fails, while the output of the output of the steering motor including the three windings is being controlled by the three steering controllers in each of which the MCU and the inverter are connected to each other, it is possible to control the assistance current of the inverter connected to the failed MCU by the remaining two MCUs, which are in the normal state, as in the case in which the three steering controllers are in the normal state, thereby improving redundancy and reliability in the vehicle and assisting the vehicle without reduction or loss in steering performance.

Figure 9:
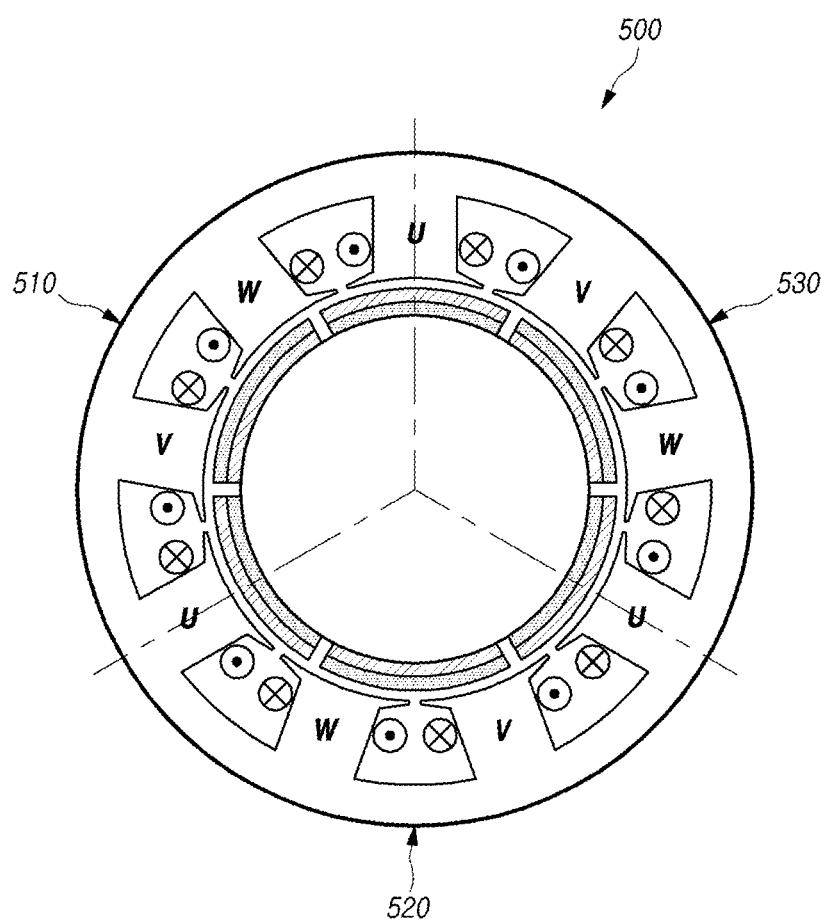
FIG. 9 is a diagram illustrating a steering motor according to embodiments.

FIG. 9 is a diagram illustrating a steering motor according to embodiments.

Referring to FIG. 9, the steering motor 500 may include first to third windings 510, 520, and 530. The steering motor 500 may include a 9 slot motor but is not limited thereto. The steering motor 500 may include any motor including three windings. In particular, the steering motor 500 may include a 6 pole 9 slot motor.

Here, the steering motor 500 and the first to third windings 510, 520, and 530 of the steering motor 500 may be interpreted to be the same components as the steering motor 200 and the first to third windings 210, 220, and 230 of the steering motor 200, as described above with reference to FIG. 3, and the steering motor 430 and the first to third windings 431, 432, and 433 of the steering motor 430, as described above with reference to FIGS. 5 to 8.

Hereinafter, a steering control method according to embodiments will be described with reference to the accompanying drawings. In particular, descriptions of features the same as those of the steering control device, the steering motor, and the steering apparatus according to embodiments, as described above with reference to FIGS. 1 to 9, will be omitted hereinafter, for the sake of brevity. The steering control method according to embodiments may be performed using the steering control device, the steering motor, and the steering apparatus.

The steering control method according to embodiments may include steps of: controlling the output of the first winding of the steering motor by the first steering controller, the output of the second winding of the steering motor by the second steering controller, and the output of the third winding of the steering motor by the third steering controller; and monitoring respective states by the first to third steering controllers and controlling the steering motor in accordance with the result of the monitoring.

Figure 10:
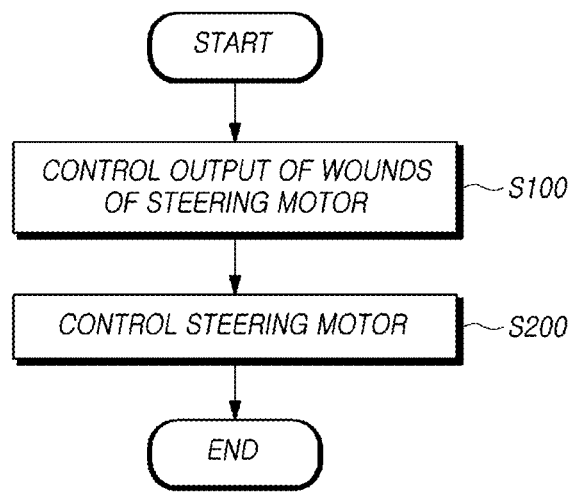
FIG. 10 is a flowchart illustrating an overall process of a steering control method according to embodiments.

FIG. 10 is a flowchart illustrating an overall process of the steering control method according to embodiments.

Referring to FIG. 10, the steering control method according to embodiments may include step S100 of controlling the outputs of the windings of the steering motor and step S200 of controlling the steering motor.

First, in the step S100, the first steering controller may control the output of the first winding of the steering motor, the second steering controller may control the output of the second winding of the steering motor, and the third steering controller may control the output of the third winding of the steering motor.

Afterwards, in the step S200, the first to third steering controllers may monitor the respective states and control the steering motor in accordance with the result of the monitoring.

FIGS. 11 to 16 are specific flowcharts illustrating a method of controlling the steering motor according to embodiments.

Figure 11:
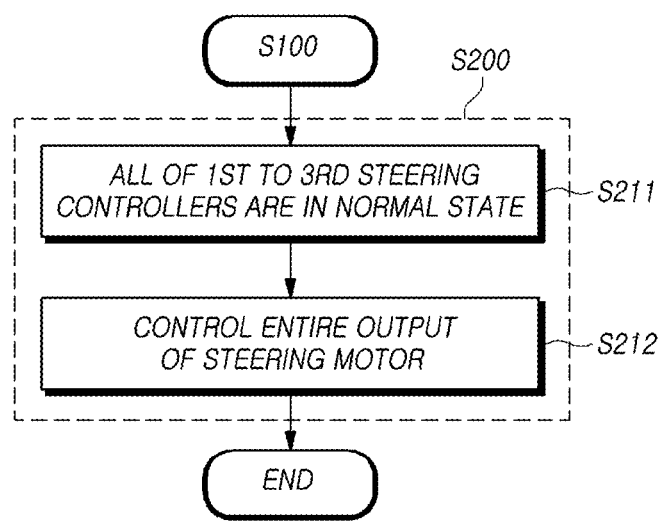
FIGS. 11 to 16 are specific flowcharts illustrating a method of controlling the steering motor according to embodiments.

Referring to FIG. 11, first, in S211, all of the first to third steering controllers may be determined to be in a normal state.

If all of the first to third steering controllers are in the normal state, afterwards, in S212, the first steering controller may generate the first assistance current corresponding to the first target assistance current value and provide the first assistance current to the first winding of the steering motor, the second steering controller may generate the second assistance current corresponding to the second target assistance current value and provide the second assistance current to the second winding of the steering motor, and the third steering controller may generate the third assistance current corresponding to the third target assistance current value and provide the third assistance current to the third winding of the steering motor, in which the first to third steering controllers control the entire output of the steering motor by controlling the outputs of the first to third windings of the steering motor in accordance with the first to third assistance currents.

Figure 12:
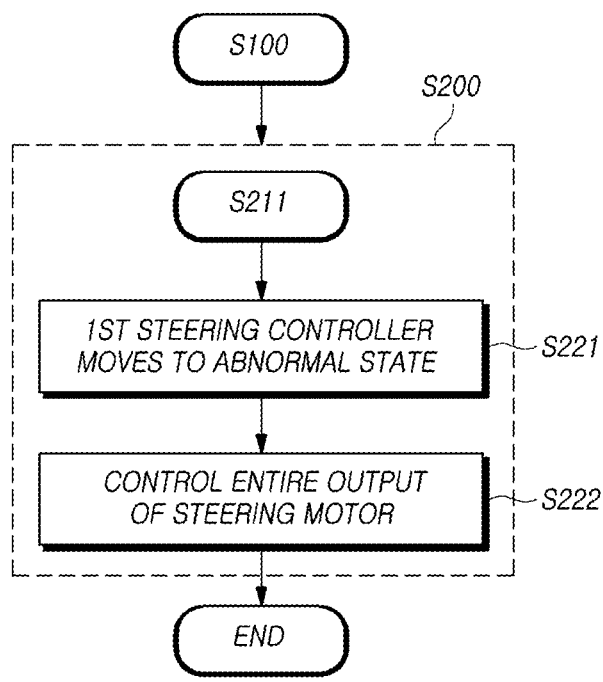

Referring to FIG. 12, first, in S221, the first steering controller may be determined to move to an abnormal state.

Afterwards, if the first steering controller moves to an abnormal state, in S222, the second steering controller may generate the second assistance current corresponding to the second target assistance current value and provide the second assistance current to the second winding, and the third steering controller may generate the third assistance current corresponding to the third target assistance current value and provide the third assistance current to the third winding, in which the second and third steering controller may control the entire output of the steering motor by controlling the outputs of the second and third windings of the steering motor in accordance with the second and third assistance currents.

Figure 13:
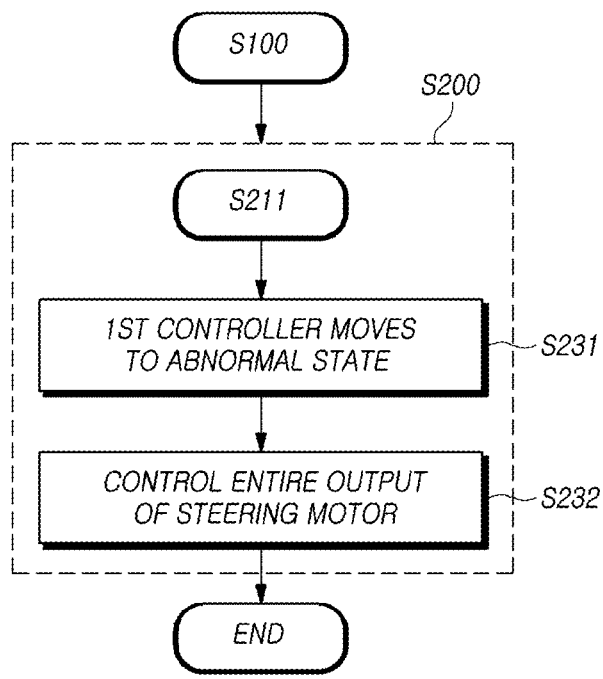

Referring to FIG. 13, first, in S231, the first controller controlling the first steering motor power supply of the first steering controller may be determined to move to an abnormal state.

Afterwards, if the first controller controlling the first steering motor power supply of the first steering controller moves to an abnormal state, in S232, the second controller may determine the second target assistance current value, the second steering motor power supply may generate the second assistance current corresponding to the second target assistance current value and provide the second assistance current to the second winding, the third controller may determine the third target assistance current value, the third steering motor power supply may generate the third assistance current corresponding to the third target assistance current value and provide the third assistance current to the third winding, the first controller may receive the first target assistance current value determined by the second controller of the second steering controller or the third controller of the third steering controller, and the first steering motor power supply may generate the first assistance current corresponding to the first target assistance current value and provide the first assistance current to the first winding, in which the first to third steering controllers may control the entire output of the steering motor by controlling the outputs of the first to third windings of the steering motor in accordance with the first to third assistance currents.

Figure 14:
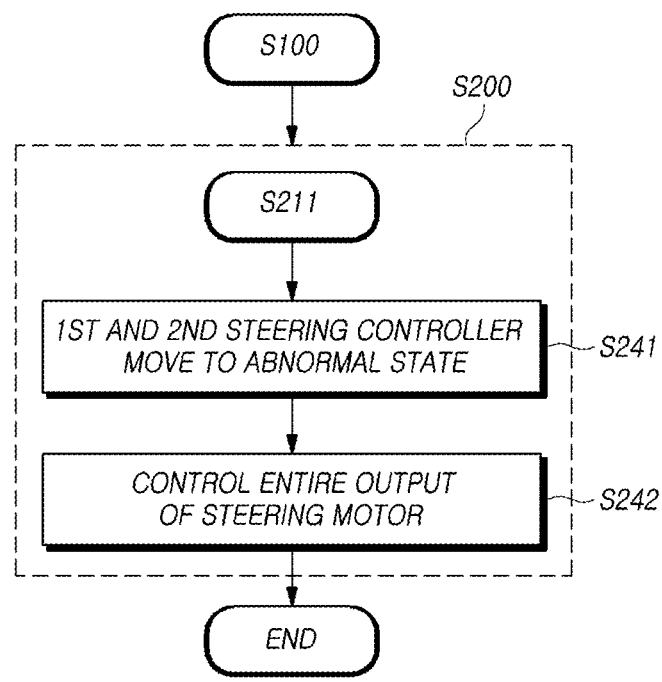

Referring to FIG. 14, first, in S241, the first and second steering controller may be determined to move to an abnormal state.

Afterwards, if the first and second steering controller moves to an abnormal state, in S242, the third steering controller may generate the third assistance current corresponding to the third target assistance current value and provide the third assistance current to the third winding, in which the entire output of the steering motor may be controlled by controlling the output of the third winding of the steering motor in accordance with the third assistance current.

Figure 15:
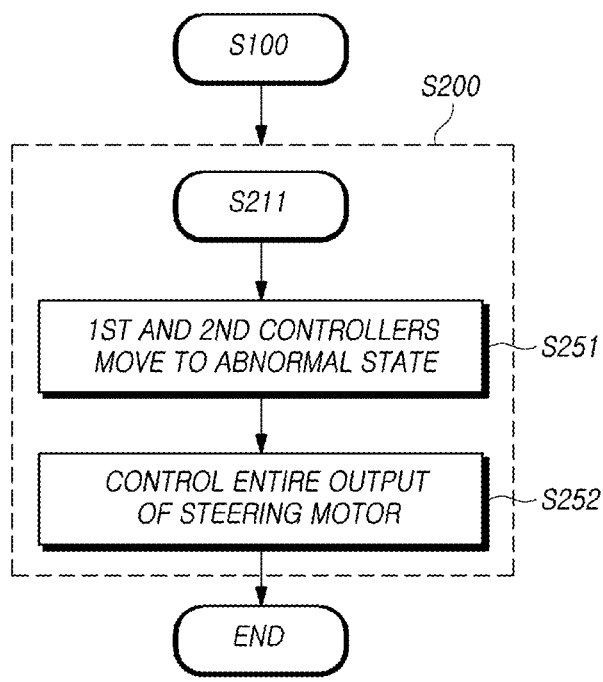

Referring to FIG. 15, first, in S251, the first controller controlling the first steering motor power supply of the first steering controller and the second controller controlling the second steering motor power supply of the second steering controller may be determined to move to an abnormal state.

Afterwards, if the first controller controlling the first steering motor power supply of the first steering controller and the second controller controlling the second steering motor power supply of the second steering controller move to an abnormal state, in S252, the third controller may determine the third target assistance current value, the third steering motor power supply may generate the third assistance current corresponding to the third target assistance current value and provide the third assistance current to the third winding, the first controller may receive the first target assistance current value determined by the third controller of the third steering controller, the first steering motor power supply may generate the first assistance current corresponding to the first target assistance current value and provide the first assistance current to the first winding, the second controller may receive the second target assistance current value determined by the third controller of the third steering controller, and the second steering motor power supply may generate the second assistance current corresponding to the second target assistance current value and provide the second assistance current to the second winding, in which the first to third steering controllers may control the entire output of the steering motor by controlling the outputs of the first to third windings of the steering motor in accordance with the first to third assistance currents.

Figure 16:
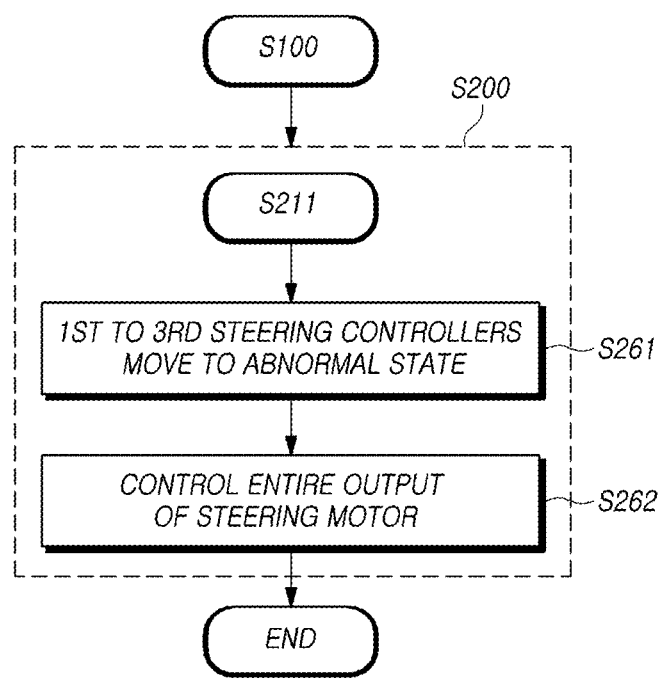

Referring to FIG. 16, first, in S261, all of the first to third steering controllers may be determined to move to an abnormal state.

Afterwards, if all of the first to third steering controllers move to an abnormal state, in S262, the first to third steering controllers may control the entire output of the steering motor so that the steering of the vehicle is operated in accordance with the manual.

Figure 17:
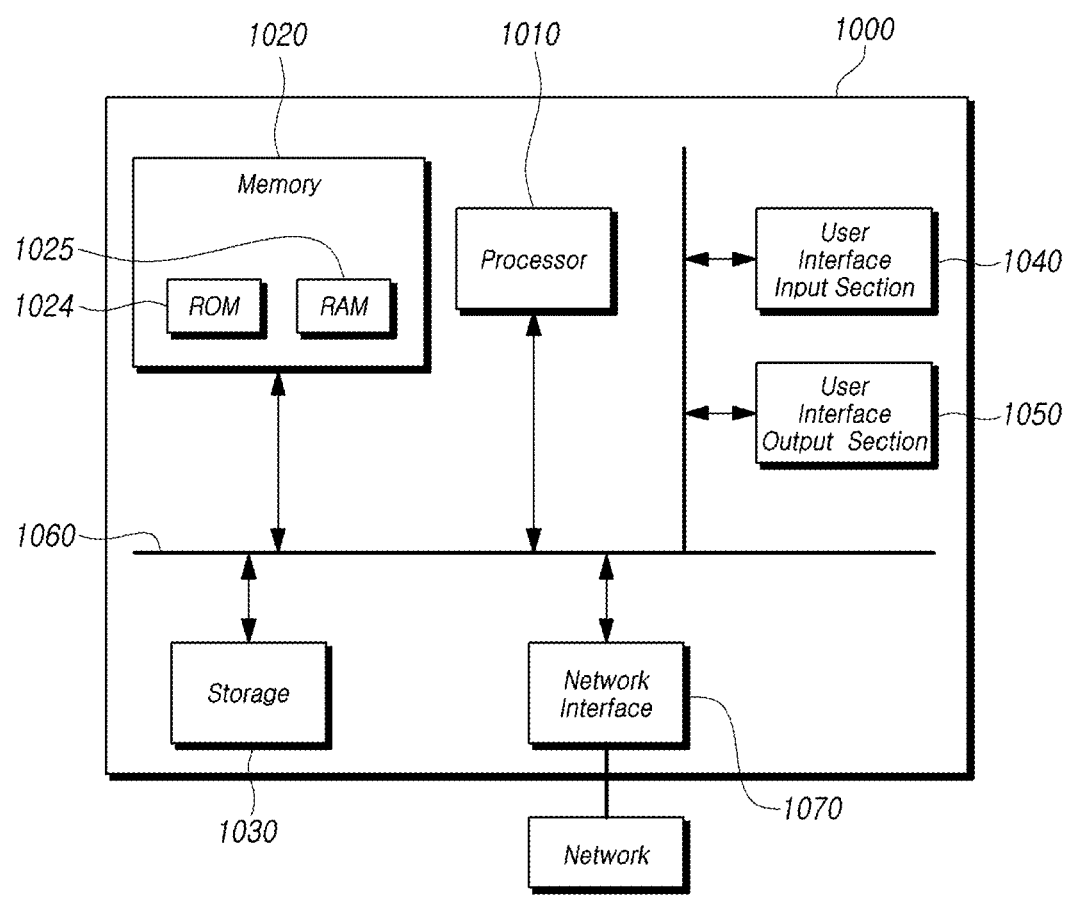
FIG. 17 is a block diagram illustrating a computer system of a steering control device, a steering motor, and a steering apparatus according to embodiments.

FIG. 17 is a block diagram illustrating a computer system of a steering control device, a steering motor, and a steering apparatus according to embodiments.

Referring to FIG. 17, embodiments of the present disclosure may be realized in a computer system, for example, in the form of a computer readable medium. As illustrated in FIG. 17, the computer system 1000 of the steering control device, the steering motor, the steering apparatus, or the like may include at least one among at least one processor 1010, a memory 1020, a storage 1030, a user interface input section 1040, a user interface output section 1050, or combinations thereof. These components may communicate with each other via a bus 1060. In addition, the computer system 1000 may further include a network interface 1070 allowing the computer system 1000 to access a network. The processor 1010 may be a central processing unit (CPU) or a semiconductor device able to execute processing instructions stored in the memory 1020 and/or the storage 1030. Each of the memory 1020 and the storage 1030 may include various types of volatile/non-volatile storage media. For example, the memory may include a read-only memory (ROM) 1021 and a random access memory (RAM).

Accordingly, embodiments of the present disclosure may be realized as a computer executable method or computer readable instructions recorded in a non-volatile computer readable medium. When such instructions are executed by a processor, at least one form of the method according to embodiments may be executed.

Although the steering control device, the steering motor, the steering apparatus, and the steering control method according to embodiments have been described, those having ordinary knowledge in the technical field, to which the present disclosure pertains, will appreciate that various modifications and changes in form are possible without departing from the scope of the appended Claims, the detailed description of the present disclosure, and the accompanying drawings, and such equivalents should be construed as being included within the scope of the present disclosure.

What is claimed is:

1. A steering control device comprising:
   a first steering controller connected to a first winding of a steering motor;
   a second steering controller connected to a second winding of the steering motor; and
   a third steering controller connected to a third winding of the steering motor,
   wherein the first to third steering controllers monitor corresponding states and control the steering motor in accordance with a result of the monitoring, and
   wherein, in response to detection of abnormality of one or more of the first to third steering controllers, one or more others of the first to third steering controllers of which abnormality is not detected are configured to increase one or more currents supplied to one or more of the first to third windings connected to the one or more others of the first to third steering controllers of which abnormality is not detected.

2. The steering control device according to claim 1, wherein, if all of the first to third steering controllers are in a normal state,
   the first steering controller generates a first assistance current corresponding to a first target assistance current value and provides the first assistance current to the first winding of the steering motor,
   the second steering controller generates a second assistance current corresponding to a second target assistance current value and provides the second assistance current to the second winding of the steering motor, and
   the third steering controller generates a third assistance current corresponding to a third target assistance current value and provides the third assistance current to the third winding of the steering motor,
   wherein the first to third steering controllers control an entire output of the steering motor by controlling outputs of the first to third windings of the steering motor in accordance with the first to third assistance currents.

3. The steering control device according to claim 2, wherein, if the first steering controller moves to an abnormal state,
the second steering controller generates the second inverter control signal corresponding to the second target assistance current value and provides the second inverter control signal to the second winding, and
the third steering controller generates the third assistance current corresponding to the third target assistance current value and provides the third assistance current to the third winding,
wherein the second and third steering controllers control the entire output of the steering motor by controlling the outputs of the second and third windings of the steering motor in accordance with the second and third assistance currents.

4. The steering control device according to claim 3, wherein the second and third target assistance current values are determined so as not to exceed maximum currents of the second and third steering controllers, respectively, and so that the entire output of the steering motor does not exceed a maximum output of the steering motor.

5. The steering control device according to claim 4, wherein the second and third target assistance current values are determined by reflecting the first target assistance current value in a case in which all of the first to third steering controllers are in the normal state to the second and third target assistance current values in a case in which all of the first to third steering controllers are in the normal state.

6. The steering control device according to claim 2, wherein, if a first controller controlling a first steering motor power supply of the first steering controller moves to an abnormal state,
the second steering controller determines the second target assistance current value by a second controller, generates the second assistance current corresponding to the second target assistance current value by a second steering motor power supply, and provides the second assistance current to the second winding,
the third steering controller determines the third target assistance current value by a third controller, generates the third assistance current corresponding to the third target assistance current value by a third steering motor power supply, and provides the third assistance current to the third winding, and
the first steering controller receives the first target assistance current value determined by the second controller of the second steering controller or the third controller of the third steering controller, generates the first assistance current corresponding to the first target assistance current value by the first steering motor power supply, and provides the first assistance current to the first winding,
wherein the first to third steering controllers control the entire output of the steering motor by controlling the outputs of the first to third windings of the steering motor in accordance with the first to third assistance currents.

7. The steering control device according to claim 2, wherein, if the first and second steering controllers move to an abnormal state,
the third steering controller generates the third assistance current corresponding to the third target assistance current value and provides the third assistance current to the third winding,
wherein the third steering controller controls the entire output of the steering motor by controlling the output of the third winding of the steering motor in accordance with the third assistance current.

8. The steering control device according to claim 2, wherein, if a first controller controlling a first steering motor power supply of the first steering controller and a second controller controlling a second steering motor power supply of the second steering controller move to an abnormal state,
the third steering controller determines the third target assistance current value by a third controller, generates the third assistance current corresponding to the third target assistance current value by a third steering motor power supply, and provides the third assistance current to the third winding,
the first steering controller receives the first target assistance current value determined by the third controller of the third steering controller, generates the first assistance current corresponding to the first target assistance current value by the first steering motor power supply, and provides the first assistance current to the first winding,
the second steering controller receives the second target assistance current value determined by the third controller of the third steering controller, generates the second assistance current corresponding to the second target assistance current value by the second steering motor power supply, and provides the second assistance current to the second winding,
wherein the first to third steering controllers control the entire output of the steering motor by controlling the outputs of the first to third windings of the steering motor in accordance with the first to third assistance currents.

9. A steering control method comprising:
controlling an output of a first winding of a steering motor by a first steering controller, an output of a second winding of the steering motor by a second steering controller, and an output of a third winding of the steering motor by a third steering controller; and
monitoring respective states by the first to third steering controllers and controlling the steering motor in accordance with a result of the monitoring,
wherein the controlling of the steering motor comprises, in response to detection of abnormality of one or more of the first to third steering controllers, by one or more others of the first to third steering controllers of which abnormality is not detected, increasing one or more currents supplied to one or more of the first to third windings connected to the one or more others of the first to third steering controllers of which abnormality is not detected.

10. The steering control method according to claim 9, wherein, if all of the first to third steering controllers are in a normal state, the controlling of the steering motor comprises:
generating, by the first steering controller, a first assistance current corresponding to a first target assistance current value and providing the first assistance current to the first winding of the steering motor;
generating, by the second steering controller, a second assistance current corresponding to a second target assistance current value and providing the second assistance current to the second winding of the steering motor;
generating, by the third steering controller, a third assistance current corresponding to a third target assistance current value and providing the third assistance current to the third winding of the steering motor; and controlling, by the first to third steering controllers, an entire output of the steering motor by controlling outputs of the first to third windings of the steering motor in accordance with the first to third assistance currents.

11. The steering control method according to claim 10, wherein, if the first steering controller moves to an abnormal state, the controlling of the steering motor comprises:
generating, by the second steering controller, the second inverter control signal corresponding to the second target assistance current value and providing the second inverter control signal to the second winding;
generating, by the third steering controller, the third assistance current corresponding to the third target assistance current value and providing the third assistance current to the third winding; and
controlling, by the second and third steering controller, the entire output of the steering motor by controlling the outputs of the second and third windings of the steering motor in accordance with the second and third assistance currents.

12. The steering control method according to claim 11, wherein the second and third target assistance current values are determined so as not to exceed maximum currents of the second and third steering controllers, respectively, and so that the entire output of the steering motor does not exceed a maximum output of the steering motor.

13. The steering control method according to claim 12, wherein the second and third target assistance current values are determined by reflecting the first target assistance current value in a case in which all of the first to third steering controllers are in the normal state to the second and third target assistance current values in a case in which all of the first to third steering controllers are in the normal state.

14. The steering control method according to claim 10, wherein, if a first controller controlling a first steering motor power supply of the first steering controller moves to an abnormal state, the controlling of the steering motor comprises:
determining the second target assistance current value by a second controller, generating the second assistance current corresponding to the second target assistance current value by a second steering motor power supply, and providing the second assistance current to the second winding;
determining the third target assistance current value by a third controller, generating the third assistance current corresponding to the third target assistance current value by a third steering motor power supply, and providing the third assistance current to the third winding;
receiving the first target assistance current value determined by the second controller of the second steering controller or the third controller of the third steering controller, generating the first assistance current corresponding to the first target assistance current value by the first steering motor power supply, and providing the first assistance current to the first winding; and
controlling, by the first to third steering controllers, the entire output of the steering motor by controlling the outputs of the first to third windings of the steering motor in accordance with the first to third assistance currents.

15. The steering control method according to claim 10, wherein, if the first and second steering controllers move to an abnormal state, the controlling of the steering motor comprises:
generating, by the third steering controller, the third assistance current corresponding to the third target assistance current value and providing the third assistance current to the third winding; and
controlling the entire output of the steering motor by controlling the output of the third winding of the steering motor in accordance with the third assistance current.

16. The steering control method according to claim 10, wherein, if a first controller controlling a first steering motor power supply of the first steering controller and a second controller controlling a second steering motor power supply of the second steering controller move to an abnormal state, the controlling of the steering motor comprises:
determining the third target assistance current value by a third controller, generating the third assistance current corresponding to the third target assistance current value by a third steering motor power supply, and providing the third assistance current to the third winding;
receiving, by the first controller, the first target assistance current value determined by the third controller of the third steering controller, generating the first assistance current corresponding to the first target assistance current value by the first steering motor power supply, and providing the first assistance current to the first winding;
receiving, by the second controller, the second target assistance current value determined by the third controller of the third steering controller, generating, by the second steering motor power supply, the second assistance current corresponding to the second target assistance current value, and providing the second assistance current to the second winding; and
controlling, by the first to third steering controllers, the entire output of the steering motor by controlling the outputs of the first to third windings of the steering motor in accordance with the first to third assistance currents.

* * * * *